(12) United States Patent
Merrigan et al.

(10) Patent No.: US 8,843,486 B2
(45) Date of Patent: Sep. 23, 2014

(54) SYSTEM AND METHOD FOR SCOPING SEARCHES USING INDEX KEYS

(75) Inventors: Chadd Creighton Merrigan, Redmond, WA (US); Kyle G. Peltonen, Issaquah, WA (US); Dmitriy Meyerzon, Bellevue, WA (US); David J. Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 110 days.

(21) Appl. No.: 12/569,028

(22) Filed: Sep. 29, 2009

(65) Prior Publication Data

US 2010/0017403 A1    Jan. 21, 2010

Related U.S. Application Data

(63) Continuation of application No. 10/951,123, filed on Sep. 27, 2004, now Pat. No. 7,606,793.

(51) Int. Cl.
*G06F 7/00* (2006.01)
*G06F 17/30* (2006.01)

(52) U.S. Cl.
USPC ........... 707/736; 707/739; 707/741; 707/742; 707/743; 707/744

(58) Field of Classification Search
USPC ......... 707/705, 711, 736, 739, 741, 742, 743, 707/744, 745, 746, 999.3, 999.102
See application file for complete search history.

(56) References Cited

U.S. PATENT DOCUMENTS

| 5,222,236 A | 6/1993 | Potash et al. |
|---|---|---|
| 5,257,577 A | 11/1993 | Clark |
| 5,321,833 A | 6/1994 | Chang et al. |
| 5,369,778 A | 11/1994 | San Soucie et al. |
| 5,544,360 A | 8/1996 | Lewak et al. |
| 5,594,660 A | 1/1997 | Sung et al. |
| 5,606,609 A | 2/1997 | Houser et al. |
| 5,634,124 A | 5/1997 | Khoyi et al. |

(Continued)

FOREIGN PATENT DOCUMENTS

| CA | 2279119 | 1/2001 |
|---|---|---|
| DE | 10029644 A1 | 1/2002 |

(Continued)

OTHER PUBLICATIONS

Mittal et al., "Framework for Synthesizing Semantic-Level Indices," Multimedia Tools and Applications, Jun. 2003. vol. 20, Iss. 2, pp. 1-24. Download: http://www.springerlink.com/content/tv632274r1267305/fulltext.pdf.

(Continued)

*Primary Examiner* — Hares Jami
(74) *Attorney, Agent, or Firm* — Merchant & Gould P.C.

(57) ABSTRACT

A set of index keys is included in an index search system that are associated with the scope of the search rather than the content of the documents that are the target of the search. These scope related index keys, or scope keys allows the scope of the search to be selected, reducing the number of documents that a search is required to sift through to obtain results. Furthermore, compound scopes are recognized and stored such that an index of complex search scopes is provided to eliminate rehashing of the searches based on these complex search scopes.

20 Claims, 7 Drawing Sheets

(56) References Cited

U.S. PATENT DOCUMENTS

| | | |
|---|---|---|
| 5,729,730 A | 3/1998 | Wlaschin et al. |
| 5,765,150 A | 6/1998 | Burrows |
| 5,826,269 A | 10/1998 | Hussey |
| 5,828,999 A | 10/1998 | Bellegarda et al. |
| 5,848,404 A | 12/1998 | Hafner et al. |
| 5,870,739 A | 2/1999 | Davis, III et al. |
| 5,870,740 A | 2/1999 | Rose et al. |
| 5,890,147 A | 3/1999 | Peltonen et al. |
| 5,893,092 A | 4/1999 | Driscoll |
| 5,893,116 A | 4/1999 | Simmonds et al. |
| 5,905,866 A | 5/1999 | Nakabayashi et al. |
| 5,913,210 A | 6/1999 | Call |
| 5,920,859 A | 7/1999 | Li |
| 5,933,822 A | 8/1999 | Braden-Harder et al. |
| 5,933,851 A | 8/1999 | Kojima et al. |
| 5,943,670 A | 8/1999 | Prager |
| 5,956,722 A | 9/1999 | Jacobson et al. |
| 5,960,383 A | 9/1999 | Fleischer |
| 5,983,216 A | 11/1999 | Kirsch et al. |
| 5,987,457 A | 11/1999 | Ballard |
| 6,006,225 A | 12/1999 | Bowman et al. |
| 6,012,053 A | 1/2000 | Pant et al. |
| 6,026,398 A | 2/2000 | Brown et al. |
| 6,029,164 A | 2/2000 | Birrell et al. |
| 6,032,196 A | 2/2000 | Monier |
| 6,038,610 A | 3/2000 | Belfiore et al. |
| 6,041,323 A | 3/2000 | Kubota |
| 6,070,158 A | 5/2000 | Kirsch et al. |
| 6,070,191 A | 5/2000 | Narendran et al. |
| 6,098,064 A | 8/2000 | Pirolli et al. |
| 6,115,709 A | 9/2000 | Gilmour et al. |
| 6,125,361 A | 9/2000 | Chakrabarti et al. |
| 6,128,701 A | 10/2000 | Malcolm et al. |
| 6,145,003 A | 11/2000 | Sanu et al. |
| 6,151,624 A | 11/2000 | Teare et al. |
| 6,167,369 A | 12/2000 | Schulze |
| 6,167,402 A | 12/2000 | Yeager |
| 6,178,419 B1 | 1/2001 | Legh-Smith et al. |
| 6,182,065 B1 | 1/2001 | Yeomans |
| 6,182,067 B1 | 1/2001 | Presnell et al. |
| 6,182,085 B1 | 1/2001 | Eichstaedt et al. |
| 6,182,113 B1 | 1/2001 | Narayanaswami |
| 6,185,558 B1 | 2/2001 | Bowman et al. |
| 6,199,081 B1 | 3/2001 | Meyerzon et al. |
| 6,202,058 B1 | 3/2001 | Rose et al. |
| 6,208,988 B1 | 3/2001 | Schultz |
| 6,216,123 B1 | 4/2001 | Robertson et al. |
| 6,222,559 B1 | 4/2001 | Asano et al. |
| 6,240,407 B1 | 5/2001 | Chang et al. |
| 6,240,408 B1 | 5/2001 | Kaufman |
| 6,247,013 B1 | 6/2001 | Morimoto |
| 6,263,364 B1 | 7/2001 | Najork et al. |
| 6,269,370 B1 | 7/2001 | Kirsch |
| 6,272,507 B1 | 8/2001 | Pirolli et al. |
| 6,285,367 B1 | 9/2001 | Abrams et al. |
| 6,285,999 B1 | 9/2001 | Page |
| 6,304,864 B1 | 10/2001 | Liddy et al. |
| 6,314,421 B1 | 11/2001 | Sharnoff et al. |
| 6,317,741 B1 | 11/2001 | Burrows |
| 6,324,551 B1 | 11/2001 | Lamping et al. |
| 6,326,962 B1 | 12/2001 | Szabo |
| 6,327,590 B1 | 12/2001 | Chidlovskii |
| 6,336,117 B1 | 1/2002 | Massarani et al. |
| 6,349,308 B1 | 2/2002 | Whang et al. |
| 6,351,467 B1 | 2/2002 | Dillon |
| 6,351,755 B1 | 2/2002 | Najork et al. |
| 6,360,215 B1 | 3/2002 | Judd et al. |
| 6,381,597 B1 | 4/2002 | Lin |
| 6,385,602 B1 | 5/2002 | Tso et al. |
| 6,389,436 B1 | 5/2002 | Chakrabarti et al. |
| 6,415,319 B1 | 7/2002 | Ambroziak |
| 6,418,433 B1 | 7/2002 | Chakrabarti et al. |
| 6,418,452 B1 | 7/2002 | Kraft et al. |
| 6,418,453 B1 | 7/2002 | Kraft et al. |
| 6,424,966 B1 | 7/2002 | Meyerzon et al. |
| 6,442,606 B1 | 8/2002 | Subbaroyan et al. |
| 6,473,752 B1 | 10/2002 | Fleming |
| 6,484,204 B1 | 11/2002 | Rabinovich |
| 6,516,312 B1 | 2/2003 | Kraft et al. |
| 6,526,440 B1 | 2/2003 | Bharat |
| 6,539,376 B1 | 3/2003 | Sundaresan et al. |
| 6,546,388 B1 | 4/2003 | Edlund et al. |
| 6,547,829 B1 | 4/2003 | Meyerzon et al. |
| 6,549,896 B1 | 4/2003 | Candan et al. |
| 6,549,897 B1 | 4/2003 | Katariya et al. |
| 6,553,364 B1 | 4/2003 | Wu |
| 6,557,036 B1 | 4/2003 | Kavacheri et al. |
| 6,560,600 B1 | 5/2003 | Broder |
| 6,594,682 B2 | 7/2003 | Peterson et al. |
| 6,598,040 B1 | 7/2003 | Cragun et al. |
| 6,598,047 B1 | 7/2003 | Russell et al. |
| 6,598,051 B1 | 7/2003 | Wiener et al. |
| 6,601,075 B1 | 7/2003 | Huang et al. |
| 6,622,140 B1 | 9/2003 | Kantrowitz |
| 6,628,304 B2 | 9/2003 | Mitchell et al. |
| 6,631,369 B1 | 10/2003 | Meyerzon et al. |
| 6,633,867 B1 | 10/2003 | Kraft et al. |
| 6,633,868 B1 | 10/2003 | Min |
| 6,636,853 B1 | 10/2003 | Stephens |
| 6,638,314 B1 | 10/2003 | Meyerzon et al. |
| 6,654,742 B1 | 11/2003 | Kobayashi et al. |
| 6,671,683 B2 | 12/2003 | Kanno |
| 6,678,692 B1 | 1/2004 | Hyatt |
| 6,701,318 B2 | 3/2004 | Fox et al. |
| 6,718,324 B2 | 4/2004 | Edlund et al. |
| 6,718,365 B1 | 4/2004 | Dutta |
| 6,738,764 B2 | 5/2004 | Mao et al. |
| 6,763,362 B2 | 7/2004 | McKeeth |
| 6,766,316 B2 | 7/2004 | Caudill et al. |
| 6,766,422 B2 | 7/2004 | Beyda |
| 6,772,141 B1 | 8/2004 | Pratt et al. |
| 6,775,659 B2 | 8/2004 | Clifton-Bligh |
| 6,775,664 B2 | 8/2004 | Lang et al. |
| 6,778,997 B2 | 8/2004 | Sundaresan et al. |
| 6,829,606 B2 | 12/2004 | Ripley |
| 6,859,800 B1 | 2/2005 | Roche et al. |
| 6,862,710 B1 | 3/2005 | Marchisio |
| 6,868,411 B2 | 3/2005 | Shanahan |
| 6,871,202 B2 | 3/2005 | Broder |
| 6,873,982 B1 | 3/2005 | Bates et al. |
| 6,883,135 B1 | 4/2005 | Obata et al. |
| 6,886,010 B2 | 4/2005 | Kostoff |
| 6,886,129 B1 | 4/2005 | Raghavan et al. |
| 6,898,592 B2 | 5/2005 | Peltonen et al. |
| 6,910,029 B1 | 6/2005 | Sundaresan |
| 6,931,397 B1 | 8/2005 | Sundaresan |
| 6,934,714 B2 | 8/2005 | Meinig |
| 6,944,609 B2 | 9/2005 | Witbrock |
| 6,947,930 B2 | 9/2005 | Anick et al. |
| 6,959,326 B1 | 10/2005 | Day et al. |
| 6,973,490 B1 | 12/2005 | Robertson et al. |
| 6,990,628 B1 | 1/2006 | Palmer et al. |
| 6,999,959 B1 | 2/2006 | Lawrence et al. |
| 7,003,442 B1 | 2/2006 | Tsuda |
| 7,010,532 B1 | 3/2006 | Stakutis et al. |
| 7,016,540 B1 | 3/2006 | Gong et al. |
| 7,028,029 B2 | 4/2006 | Kamvar et al. |
| 7,039,234 B2 | 5/2006 | Geidl et al. |
| 7,051,023 B2 | 5/2006 | Kapur et al. |
| 7,065,523 B2 | 6/2006 | Peltonen et al. |
| 7,072,888 B1 | 7/2006 | Perkins |
| 7,076,483 B2 | 7/2006 | Preda et al. |
| 7,080,073 B1 | 7/2006 | Jiang et al. |
| 7,085,755 B2 | 8/2006 | Bluhm et al. |
| 7,107,218 B1 | 9/2006 | Preston |
| 7,152,059 B2 | 12/2006 | Monteverde |
| 7,181,438 B1 | 2/2007 | Szabo |
| 7,197,497 B2 | 3/2007 | Cossock |
| 7,228,301 B2 | 6/2007 | Meyerzon et al. |
| 7,231,399 B1 | 6/2007 | Bem et al. |
| 7,243,102 B1 | 7/2007 | Naam et al. |
| 7,246,128 B2 | 7/2007 | Jordahl |
| 7,257,574 B2 | 8/2007 | Parikh |
| 7,257,577 B2 | 8/2007 | Fagin et al. |

(56) References Cited

U.S. PATENT DOCUMENTS

| | | |
|---|---|---|
| 7,260,573 B1 | 8/2007 | Jeh et al. |
| 7,281,002 B2 | 10/2007 | to Farrell |
| 7,283,997 B1 | 10/2007 | Howard et al. |
| 7,308,643 B1 | 12/2007 | Zhu et al. |
| 7,328,401 B2 | 2/2008 | Obata et al. |
| 7,346,604 B1 | 3/2008 | Bharat et al. |
| 7,346,839 B2 | 3/2008 | Acharya et al. |
| 7,356,530 B2 | 4/2008 | Kim et al. |
| 7,386,527 B2 | 6/2008 | Harris et al. |
| 7,415,459 B2 | 8/2008 | Peltonen et al. |
| 7,428,530 B2 | 9/2008 | Ramarathnam et al. |
| 7,496,561 B2 | 2/2009 | Caudill et al. |
| 7,499,919 B2 | 3/2009 | Meyerzon et al. |
| 7,519,529 B1 | 4/2009 | Horvitz |
| 7,580,568 B1 | 8/2009 | Wang et al. |
| 7,584,221 B2 | 9/2009 | Robertson et al. |
| 7,599,917 B2 | 10/2009 | Meyerzon et al. |
| 7,603,616 B2 | 10/2009 | Obata et al. |
| 7,606,793 B2 | 10/2009 | Merrigan et al. |
| 7,644,107 B2 | 1/2010 | Neagovici-Negoescu et al. |
| 7,685,084 B2 | 3/2010 | Sisk et al. |
| 7,689,531 B1 | 3/2010 | Diao et al. |
| 7,689,559 B2 | 3/2010 | Canright et al. |
| 7,693,829 B1 | 4/2010 | Alshawi |
| 7,716,198 B2 | 5/2010 | Meyerzon et al. |
| 7,716,225 B1 | 5/2010 | Dean et al. |
| 7,716,226 B2 | 5/2010 | Barney |
| 7,720,830 B2 | 5/2010 | Wen et al. |
| 7,739,277 B2 | 6/2010 | Meyerzon et al. |
| 7,761,448 B2 | 7/2010 | Meyerzon et al. |
| 7,792,833 B2 | 9/2010 | Meyerzon et al. |
| 7,827,181 B2 | 11/2010 | Petriuc |
| 7,840,569 B2 | 11/2010 | Meyerzon et al. |
| 7,962,462 B1 | 6/2011 | Lamping et al. |
| 8,082,246 B2 | 12/2011 | Meyerzon et al. |
| 8,326,829 B2 | 12/2012 | Gupta |
| 8,370,331 B2 | 2/2013 | Pontier et al. |
| 8,412,702 B2 | 4/2013 | Cozzi |
| 8,412,717 B2 | 4/2013 | Liao et al. |
| 2001/0042076 A1 | 11/2001 | Fukuda |
| 2002/0016787 A1 | 2/2002 | Kanno |
| 2002/0026390 A1 | 2/2002 | Ulenas et al. |
| 2002/0032772 A1 | 3/2002 | Olstad et al. |
| 2002/0055940 A1 | 5/2002 | Elkan |
| 2002/0062323 A1 | 5/2002 | Takatori et al. |
| 2002/0078045 A1 | 6/2002 | Dutta |
| 2002/0083054 A1 | 6/2002 | Peltonen et al. |
| 2002/0099694 A1 | 7/2002 | Diamond et al. |
| 2002/0103798 A1 | 8/2002 | Abrol et al. |
| 2002/0107861 A1 | 8/2002 | Clendinning et al. |
| 2002/0107886 A1 | 8/2002 | Gentner et al. |
| 2002/0123988 A1 | 9/2002 | Dean et al. |
| 2002/0129014 A1 | 9/2002 | Kim et al. |
| 2002/0129015 A1 | 9/2002 | Caudill et al. |
| 2002/0165873 A1 | 11/2002 | Kwok et al. |
| 2002/0168106 A1 | 11/2002 | Trajkovic |
| 2002/0169595 A1 | 11/2002 | Agichtein et al. |
| 2002/0169754 A1 | 11/2002 | Mao et al. |
| 2002/0169770 A1 | 11/2002 | Kim et al. |
| 2002/0169800 A1 | 11/2002 | Sundaresan et al. |
| 2003/0004952 A1 | 1/2003 | Nixon et al. |
| 2003/0028520 A1 | 2/2003 | Alpha |
| 2003/0037074 A1 | 2/2003 | Dwork et al. |
| 2003/0046389 A1 | 3/2003 | Thieme |
| 2003/0053084 A1 | 3/2003 | Geidl et al. |
| 2003/0055810 A1 | 3/2003 | Cragun et al. |
| 2003/0061201 A1 | 3/2003 | Grefenstette et al. |
| 2003/0065706 A1 | 4/2003 | Smyth et al. |
| 2003/0074368 A1 | 4/2003 | Schuetze et al. |
| 2003/0088545 A1 | 5/2003 | Subramaniam et al. |
| 2003/0101183 A1 | 5/2003 | Kabra et al. |
| 2003/0135490 A1 | 7/2003 | Barrett et al. |
| 2003/0195882 A1 | 10/2003 | Lee et al. |
| 2003/0208482 A1 | 11/2003 | Kim et al. |
| 2003/0217007 A1 | 11/2003 | Fukushima et al. |
| 2003/0217047 A1 | 11/2003 | Marchisio |
| 2003/0217052 A1 | 11/2003 | Rubenczyk et al. |
| 2004/0003028 A1 | 1/2004 | Emmett et al. |
| 2004/0006559 A1 | 1/2004 | Gange et al. |
| 2004/0024752 A1 | 2/2004 | Manber et al. |
| 2004/0049766 A1 | 3/2004 | Bloch et al. |
| 2004/0064442 A1 | 4/2004 | Popovitch |
| 2004/0093328 A1 | 5/2004 | Damle |
| 2004/0111408 A1 | 6/2004 | Caudill et al. |
| 2004/0117351 A1 | 6/2004 | Challapalli et al. |
| 2004/0141354 A1 | 7/2004 | Carnahan |
| 2004/0148278 A1 | 7/2004 | Milo et al. |
| 2004/0181515 A1 | 9/2004 | Ullmann et al. |
| 2004/0186827 A1 | 9/2004 | Anick et al. |
| 2004/0194099 A1 | 9/2004 | Lamping et al. |
| 2004/0199497 A1 | 10/2004 | Timmons |
| 2004/0205497 A1 | 10/2004 | Alexander et al. |
| 2004/0215606 A1 | 10/2004 | Cossock |
| 2004/0215664 A1 | 10/2004 | Hennings et al. |
| 2004/0249795 A1* | 12/2004 | Brockway et al. ................. 707/3 |
| 2004/0254932 A1 | 12/2004 | Gupta et al. |
| 2004/0260695 A1 | 12/2004 | Brill |
| 2004/0267722 A1* | 12/2004 | Larimore et al. ................. 707/3 |
| 2005/0033742 A1 | 2/2005 | Kamvar et al. |
| 2005/0044071 A1 | 2/2005 | Cho et al. |
| 2005/0055340 A1 | 3/2005 | Dresden |
| 2005/0055347 A9 | 3/2005 | Cho et al. |
| 2005/0060186 A1 | 3/2005 | Blowers et al. |
| 2005/0060304 A1 | 3/2005 | Parikh |
| 2005/0060310 A1 | 3/2005 | Tong et al. |
| 2005/0060311 A1 | 3/2005 | Tong et al. |
| 2005/0071328 A1 | 3/2005 | Lawrence |
| 2005/0071741 A1 | 3/2005 | Acharya et al. |
| 2005/0086192 A1 | 4/2005 | Kodama |
| 2005/0086206 A1 | 4/2005 | Balasubramanian et al. |
| 2005/0086583 A1 | 4/2005 | Obata et al. |
| 2005/0089215 A1 | 4/2005 | Staelin et al. |
| 2005/0114324 A1 | 5/2005 | Mayer |
| 2005/0125392 A1 | 6/2005 | Curtis et al. |
| 2005/0144162 A1 | 6/2005 | Liang |
| 2005/0154710 A1 | 7/2005 | Ruhlow et al. |
| 2005/0154746 A1 | 7/2005 | Liu et al. |
| 2005/0165753 A1 | 7/2005 | Chen et al. |
| 2005/0165781 A1 | 7/2005 | Kraft et al. |
| 2005/0187965 A1 | 8/2005 | Abajian |
| 2005/0192936 A1 | 9/2005 | Meek et al. |
| 2005/0192955 A1 | 9/2005 | Farrell |
| 2005/0210006 A1 | 9/2005 | Robertson |
| 2005/0210079 A1 | 9/2005 | Edlund et al. |
| 2005/0210105 A1* | 9/2005 | Hirata et al. ................. 709/205 |
| 2005/0216533 A1 | 9/2005 | Berkhin |
| 2005/0240580 A1 | 10/2005 | Zamir et al. |
| 2005/0251499 A1 | 11/2005 | Huang |
| 2005/0256865 A1* | 11/2005 | Ma et al. ................. 707/5 |
| 2005/0262050 A1 | 11/2005 | Fagin et al. |
| 2005/0283473 A1 | 12/2005 | Rousso et al. |
| 2005/0289133 A1 | 12/2005 | Arrouye et al. |
| 2005/0289193 A1 | 12/2005 | Arrouye et al. |
| 2006/0004732 A1 | 1/2006 | Odom |
| 2006/0031183 A1 | 2/2006 | Oral et al. |
| 2006/0036598 A1 | 2/2006 | Wu |
| 2006/0041521 A1 | 2/2006 | Oral et al. |
| 2006/0047643 A1 | 3/2006 | Chaman |
| 2006/0047649 A1 | 3/2006 | Liang |
| 2006/0059144 A1 | 3/2006 | Canright et al. |
| 2006/0064411 A1 | 3/2006 | Gross et al. |
| 2006/0069982 A1 | 3/2006 | Petriuc |
| 2006/0074781 A1 | 4/2006 | Meyerzon et al. |
| 2006/0074883 A1 | 4/2006 | Teevan et al. |
| 2006/0074903 A1 | 4/2006 | Meyerzon et al. |
| 2006/0095416 A1 | 5/2006 | Barkhin et al. |
| 2006/0136411 A1 | 6/2006 | Meyerzon et al. |
| 2006/0149723 A1 | 7/2006 | Finger, II |
| 2006/0161534 A1 | 7/2006 | Carson et al. |
| 2006/0173560 A1 | 8/2006 | Widrow |
| 2006/0173828 A1 | 8/2006 | Rosenberg |
| 2006/0195440 A1 | 8/2006 | Burges et al. |
| 2002/0212423 | 9/2006 | Jones et al. |
| 2006/0200460 A1 | 9/2006 | Meyerzon et al. |

(56) References Cited

U.S. PATENT DOCUMENTS

| | | |
|---|---|---|
| 2006/0206460 A1 | 9/2006 | Gadkari et al. |
| 2006/0206476 A1 | 9/2006 | Kapur et al. |
| 2006/0212423 A1 | 9/2006 | Jones et al. |
| 2006/0224554 A1 | 10/2006 | Bailey et al. |
| 2006/0248074 A1 | 11/2006 | Carmel et al. |
| 2006/0259481 A1 | 11/2006 | Handley |
| 2006/0282306 A1 | 12/2006 | Thissen-Roe |
| 2006/0282455 A1 | 12/2006 | Lee et al. |
| 2006/0287993 A1 | 12/2006 | Yao et al. |
| 2006/0294100 A1 | 12/2006 | Meyerzon et al. |
| 2007/0038616 A1 | 2/2007 | Guha |
| 2007/0038622 A1 | 2/2007 | Meyerzon et al. |
| 2007/0050338 A1 | 3/2007 | Strohm et al. |
| 2007/0067284 A1 | 3/2007 | Meyerzon et al. |
| 2007/0073748 A1 | 3/2007 | Barney |
| 2007/0085716 A1 | 4/2007 | Bar-Yossef et al. |
| 2007/0094285 A1 | 4/2007 | Agichtein et al. |
| 2007/0106659 A1 | 5/2007 | Lu et al. |
| 2007/0150473 A1 | 6/2007 | Li et al. |
| 2007/0198459 A1 | 8/2007 | Boone et al. |
| 2007/0260597 A1 | 11/2007 | Cramer et al. |
| 2007/0276829 A1 | 11/2007 | Wang et al. |
| 2008/0005068 A1 | 1/2008 | Dumais et al. |
| 2008/0016053 A1 | 1/2008 | Frieden et al. |
| 2008/0140641 A1 | 6/2008 | Wang |
| 2008/0154888 A1 | 6/2008 | Buron et al. |
| 2008/0195596 A1 | 8/2008 | Sisk et al. |
| 2009/0006356 A1 | 1/2009 | Liao et al. |
| 2009/0006358 A1 | 1/2009 | Morris et al. |
| 2009/0024606 A1 | 1/2009 | Schilit et al. |
| 2009/0070306 A1 | 3/2009 | Stroe et al. |
| 2009/0106221 A1 | 4/2009 | Meyerzon et al. |
| 2009/0106223 A1 | 4/2009 | Meyerzon et al. |
| 2009/0106235 A1 | 4/2009 | Tankovich et al. |
| 2009/0157607 A1 | 6/2009 | Tiyyagura |
| 2009/0164929 A1 | 6/2009 | Chen et al. |
| 2009/0240680 A1 | 9/2009 | Tankovich et al. |
| 2009/0259651 A1 | 10/2009 | Tankovich et al. |
| 2009/0276421 A1 | 11/2009 | Qiu |
| 2009/0307209 A1 | 12/2009 | Carmel et al. |
| 2010/0191744 A1 | 7/2010 | Meyerzon et al. |
| 2010/0268707 A1 | 10/2010 | Meyerzon et al. |
| 2011/0106850 A1 | 5/2011 | Li et al. |
| 2011/0137893 A1 | 6/2011 | Shnitko et al. |
| 2011/0235909 A1 | 9/2011 | Chenthamarakshan et al. |
| 2011/0295850 A1 | 12/2011 | Tankovich et al. |
| 2013/0198174 A1 | 8/2013 | Poznanski et al. |

FOREIGN PATENT DOCUMENTS

| | | |
|---|---|---|
| EP | 0950961 A2 | 10/1999 |
| EP | 0950961 A3 | 10/1999 |
| EP | 1050830 | 11/2000 |
| EP | 1120717 | 8/2001 |
| EP | 1282060 | 2/2002 |
| EP | 1462950 | 9/2004 |
| EP | 1557770 | 7/2005 |
| EP | 1862916 | 12/2007 |
| ID | P0027547 | 2/2011 |
| JP | 62-297950 | 12/1987 |
| JP | Hei 4-274533 | 9/1992 |
| JP | Hei 04-281565 | 10/1992 |
| JP | 2009-204442 | 8/1997 |
| JP | 2009-305622 | 11/1997 |
| JP | 10091638 | 4/1998 |
| JP | Hei 10-124524 | 5/1998 |
| JP | 10-240757 | 9/1998 |
| JP | 11-045243 | 2/1999 |
| JP | H11-232300 A | 8/1999 |
| JP | 11328191 | 11/1999 |
| JP | 2000-194713 | 7/2000 |
| JP | 2001-052017 | 2/2001 |
| JP | 2001-117934 | 4/2001 |
| JP | 2001-265774 | 9/2001 |
| JP | 2002-091843 | 3/2002 |
| JP | 2002-132769 | 5/2002 |
| JP | 2002-140365 | 5/2002 |
| JP | 2002-157271 | 5/2002 |
| JP | 2002-202992 | 7/2002 |
| JP | 2002-245089 | 8/2002 |
| JP | 2002-366549 | 12/2002 |
| JP | 2003-67419 | 3/2003 |
| JP | 2003-076715 | 3/2003 |
| JP | 2003-208434 | 7/2003 |
| JP | 2003-248696 | 9/2003 |
| JP | 2004-21589 | 1/2004 |
| JP | 2004-54588 | 2/2004 |
| JP | 2004-164555 A | 6/2004 |
| JP | 2004-192657 | 8/2004 |
| JP | 2004-265015 | 9/2004 |
| JP | 2008-146424 | 12/2006 |
| JP | 2007-507798 | 3/2007 |
| JP | 2008-033931 | 2/2008 |
| JP | 2009-252179 | 4/2008 |
| JP | 2009-509275 | 3/2009 |
| JP | 2009146248 A | 7/2009 |
| JP | 4950444 | 3/2012 |
| KR | 10-2002-0015838 | 3/2002 |
| KR | 10-2003-0081209 A | 10/2003 |
| KR | 20030080826 | 10/2003 |
| KR | 10-2006-0048716 A | 5/2006 |
| KR | 10-2006-0116042 | 11/2006 |
| KR | 10-2008-0017685 | 2/2008 |
| MY | 147720 | 1/2013 |
| RU | 2138076 C1 | 9/1999 |
| RU | 2001128643 | 7/2003 |
| RU | 2236699 | 9/2004 |
| RU | 2273879 C2 | 4/2006 |
| RU | 2319202 | 3/2008 |
| TW | I396984 | 5/2013 |
| WO | WO 02/42862 | 5/2002 |
| WO | WO 2006/121269 | 11/2006 |
| WO | WO 2007/089289 A2 | 8/2007 |
| WO | WO 2007/123416 A1 | 11/2007 |
| WO | WO 2009/072174 A1 | 6/2009 |
| ZA | 2011/00293 | 4/2012 |

OTHER PUBLICATIONS

Bohm et al., "Multidimensional Index Structures in Relational Databases," Journal of Intelligent Information Systems, Jul. 2000. vol. 15, Iss. 1, pp. 1-20. Download: http://www.springerlink.com/content/n345270t27538741/fulltext.pdf.

Christian Gross; Microsoft Interactive Developer, No. 2; "Integrating the Microsoft Index Server with Active Server Pages"; Jun. 1997; 21 pages.

Japanese Patent and Trademark Office, Interrogation mailed on Jul. 24, 2012 regarding Appeal No. 2011-026320 for Japanese Patent Application No. 2005-175174, 7 pages.

U.S. Appl. No. 12/359,939, After-final Amendment filed Mar. 11, 2014, 10 pgs.

Japanese Patent Office, Notice of Reason for Rejection for Patent Application No. 2011-527079, mailed May 15, 2014, 6 pages.

"Microsoft FAST Search Server 2010 for SharePoint, Evaluation Guide", Published on Aug. 12, 2010, Available at: http://www.microsoft.com/downloads/info.aspx?na=41
&srcfamilyid=f1e3fb39-6959-4185-8b28-5315300b6e6b
&srcdisplaylang=en&u=http%3a%2f%2download.microsoft.com%2fdownload%2fA%2f7%2fF%2fA7F98D88-BC15-4F3C-8B71-D42A5ED79964%, 60 pgs.

"Okapi Similarity Measurement (Okapi)", 11th International Web Conference, www2002, 2002, p. 1.

Agarwal et al., "Ranking Database Queries Using User Feedback: A Neural Network Approach", Fall 2006, 9 pp.

Agichten et al., "Improving Web Search Ranking by Incorporating User Behavior Information"—http://www.mathcs.emory.edu/~eugene/papers/sigir2006ranking.pdf, 8 pp.

Bandinelli, Luca, "Using Microsoft SharePoint Products and Technologies in Multilingual Scenarios", http://www.microsoft.com/

(56) References Cited

OTHER PUBLICATIONS technet/prodtechnol/office/sps2003/maintain/spmultil.mspx, published on Nov. 1, 2003, printed on May 22, 2006, 32 pp.
Becker, Hila et al., "Learning Similarity Metrics for Event Identification in Social Media," Published Date: Feb. 4-6, 2010, http://infolab.stanford.edu/~mor/research/becker-wsdm10.pdf, 10 pgs.
Brin, S. et al., "The Anatomy of a Large-Scale Hypertextual Web Search Engine", Proceedings of the Seventh International World-Wide Web Conference, Online! Apr. 14, 1998, pp. 1-26.
Burges, Christopher J.C. et al. "Learning to Rank with Nonsmooth Cost Functions"—http://books.nips.cc/papers/txt/nips19/NIPS2006_0574.txt, 2 pp.
Carmel, D. et al., "Searching XML Documents Via XML Fragments", SIGIR Toronto, Canada, Jul.-Aug. 2003, pp. 151-158.
Chakrabarti, S., "Recent Results in Automatic Web Resource Discovery", ACM Computing Surveys, vol. 31, No. 4es, Dec. 1999, pp. 1-7.
Chen, Hsinchun et al., "A Smart Itsy Bitsy Spider for the Web", Journal of the American Society for Information Science, 49(7), 1998, pp. 604-618.
Chen, Michael et al., Cha Cha, "A System for Organizing Intranet Search Results", Computer Science Department, University of California, Berkeley, 1999, pp. 1-12.
Cho et al., "Efficient Crawling Through URL Ordering", In Proceedings of the 7th International World Wide Web Conference, Apr. 1998, pp. 161-180.
Conlon, M., "Inserts Made Simple", American Printer, Nov. 1, 2002, retrieved from internet on Dec. 17, 2010: http://americanprinter.com/press/other/printing_inserts_made_simple/, 4 pp.
Creswell, N. et al., "TREC12 Web Track as CSIRO", TREC 12, Nov. 2003, 11 pp.
Craswell, Nick et al., "Relevance Weighting for Query Independent Evidence", Aug. 15-19, 2005, ACM, pp. 416-423.
Cutler, M. et al., "A New Study on Using HTML Structures to Improve Retrieval", 11th IEEE International Conference on Chicago, IL, Nov. 9-11, 1999, pp. 406-409.
Desmet, P. et al., "Estimation of Product Category Sales Responsiveness to Allocated Shelf Space", Intern. J. of Research in Marketing, vol. 15, No. 5, Dec. 9, 1998, pp. 443-457.
Ding, Chen et al., "An Improved Usage-Based Ranking", obtained online Jul. 1, 2009 at: http://www.springerlink.com/content/h0jut6d1dnrk5227/fulltext.pdf, 8 pgs.
Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.
Fagin, R. et al., "Searching the Workplace Web", IBM Almaden Research Center, In Proceedings of the Twelfth International World Wide Web Conference, Budapest, May 20, 2003, 21 pgs.
Fagin, Ronald, "Searching the Workplace Web", Mar. 3, 2005, pp. 1-10.
Fiedler, J. et al., Using the Web Efficiently: Mobile Crawlers, 17th Annual Int'l. Conference of the Association of Management on Computer Science, Aug. 1999, pp. 324-329.
Hawking, D. et al., "Overview of the TREC-8 Web Track", TREC, Feb. 2000, pp. 1-18.
Hawking, D., "Overview of the TREC-9 Track", TREC, 2000, pp. 1-16.
Hawking, D. et al., "Overview of TREC-7 Very Large Collection Track", TREC, Jan. 1999, pp. 1-13.
Heery, Rachel, "Review of Metadata Formats", Program, vol. 30, No. 4, Oct. 1996, 1996 IEEE, pp. 345-373.
Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.
Hoeber, Orland et al., "Evaluating the Effectiveness of Term Frequency Histograms for Supporting Interactive Web Search Tasks," Published Date: Feb. 25-27, 2008, http://delivery.acm.org/10.1145/1400000/1394484/p360-hoeber.pdf?key1=1394484&key2=1611170721&coll=GUIDE&dl=GUIDE&CFID=83362159&CFTOKEN=63982632, 9 pgs.
Huang et al., "Design and Implementation of a Chinese Full-Text Retrieval System Based on Probabilistic Model", IEEE, 1993, pp. 1090-1093.
Huuhka, "Google: Data Structures and Algorithms".
Jones, K. et al., "A probabilistic model of information retrieval: development and status", Department of Information Science, City University, London, Aug. 1998, 76 pgs.
Kazama, K., "A Searching and Ranking Scheme Using Hyperlinks and Anchor Texts", IPSJ SIG Technical Report, vol. 2000, No. 71, Information Processing Society of Japan, Japan, Jul. 28, 2000, pp. 17-24.
Kleinberg, Jon M., "Authoritative Sources in a Hyperlinked Environment", Proceedings of the ACM-SIAM symposium on Discrete Algorithms, 1998, 34 pp.
Kotsakis, E., "Structured Information Retrieval in XML Documents", Proceedings of the ACM Symposium on Applied Computing, Madrid, Spain, 2002, pp. 663-667.
Kucuk, Mehmet Emin, et al., "Application of Metadata Concepts to Discovery of Internet Resources", ADVIS 2000, INCS 1909, pp. 304-313, 2000.
Kwok, K.L., "A Network Approach to Probabilistic Information Retrieval", ACM Transactions on Information Systems, vol. 13, No. 3, Jul. 1995, pp. 324-353.
Lalmas, M., "Uniform Representation of Content and Structure for Structured Document Retrieval", 20th SGES International Conference on Knowledge Based Systems and Applied Artificial Intelligence, Cambridge, UK, Dec. 2000, pp. 1-12.
Lam et al, "Automatic document classification based on probabilistic reasoning: model and performance analysis," Oct. 12-15, 1997, IEEE, Computational Cybernetics and Simulation vol. 3, pp. 2719-2723.
Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.
Lee, J.K.W. et al., "Intelligent Agents for Matching Information Providers and Consumers on the Worl-Wide Web", IEEE, 1997, pp. 189-199.
Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.
Losee, R. et al., "Research in Information Organization", Literature Review, School of Information and Library Science, Section 4, pp. 53-96, Jan. 2001.
Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.
Managing External Content in Microsoft Office SharePoint Portal Server 2003, http://www.microsoft.com/technet/prodtechnol/sppt/reskit/c2261881x.mspx, published on Jun. 9, 2004, printed on May 22, 2006, 20 pp.
Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.
Matsuo, Y., "A New Definition of Subjective Distance Between Web Pages," IPSJ Journal, vol. 44, No. 1, Information Processing Society of Japan, Japan, Jan. 15, 2003, pp. 88-94.
Matveeva, Irina et al., "High Accuracy Retrieval with Multiple Nested Ranker," http://people.cs.uchicago.edu/~matveeva/RankerSIGIR06.pdf, *SIGIR'*06, Seattle, WA Aug. 6-11, 2006, 8 pages.
Microsoft Full-Text Search Technologies, http://www.microsoft.com/technet/prodtechnol/sppt/sharepoint/evaluate/featfunc/mssearc . . . , published on Jun. 1, 2001, printed on May 22, 2006, 13 pp.
Microsoft SharePoint Portal Server 2001 Resource Kit: Chapter 24, Analyzing the Default Query for the Dashboard, http://www.

(56) References Cited

OTHER PUBLICATIONS microsoft.com/technet/prodtechnol/sppt/sharepoint/reskit/part5/c24spprk.mspx, printed on May 22, 2006, 5 pp.
Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.
MSDN, "Understanding Ranking," http://msdn.microsoft.com/en-us/library/ms142524.aspx, Sep. 2007, 4 pages.
Murata, Shin-Ya et al., Information Request Base Search Result Ranking based on Click-log Analysis, Journal of Japan Database Society, Japan, Japan Database Society, Mar. 27, 2009, vol. 7, Part 4, pp. 37-42.
Najork, Marc et al., "Breadth-First Crawling Yields High-Quality Pages", ACM, Compaq Systems Research Center, Hong Kong, 2001, pp. 114-118.
Nelson, Chris, "Use of Metadata Registries for Searching for Statistical Data", IEEE 2002, Dimension EDI Ltd., pp. 232-235, 2002.
Nie, Jien Yun, "Introduction to Information Retrieval", University of Montreal Canada, 1989 pp. 1-11.
Numerico, T., "Search engines organization of information and Web Topology", http://www.cafm.lsbu.ac.uk/eminars/sse/numerico-6-dec-2004.pdf, Dec. 6, 2004, 32 pgs.
Ogilvie, P. et al., "Combining Document Representations for Known-Item Search", Proceedings of the 26th Annual International ACM SIGIR Conference on Research and Development in Information Retrieval, Toronto, Canada, 2003, pp. 143-150.
Page, L. et al., "The PageRank Citation Ranking: Bringing Order To The Web", Internet Citation, found online at: http://citeseer.nj.nec.com/page98pagerank.html, retrieved Sep. 16, 2002, 18 pgs.
Pera, Maria S. et al., "Using Word Similarity to Eradicate Junk Emails," Published Date: Nov. 6-8, 2007, http://delivery.acm.org/10.1145/1330000/1321581/p943-pera.pdf?key1=1321581&key2=8421170721&coll=GUIDE&dl=GUIDE&CFID=83362328&CFTOKEN=17563913, 4 pgs.
Planning Your Information Structure Using Microsoft Office SharePoint Portal Server 2003, http://www.microsoft.com/technet/prodtechnol/sppt/reskit/c0861881x.mspx, published on Jun. 9, 2004, printed on May 22, 2006, 22 pp.
Radlinski, Filip, et al. "Query Chains: Learning to Rank from Implicit Feedback, " http://delivery.acm.org/10.1145/1090000/1081899/p239-radlinski.pdf?key1=1081899&key2=3628533811&coll=GUIDE&CFID=27212902&CFTOKEN=53118399, *KDD*'05, Chicago, IL, Aug. 21-24, 2005, 10 pages.
Robertson, S. et al., "Okapi at TREC-3", Centre for Interactive Systems Research Department of Information Science, Third Text Retrieval Conference, 1995, 19 pp. (U.S. Official Action 14917.0717USI1, Dec. 21, 2011).
Robertson, S. et al., "Okapi at TREC-4", 1996, 24 pp.
Robertson, S. et al., "Some Simple Effective Approximations to the 2-Poisson Model for Probabilistic Weighted Retrieval", Proceedings of the 17th Annual International ACM SIGIR Conference on Research and Development in Information Retrieval, 1994, pp. 232-241.
Schulz, Stefan, et al., "Indexing Medical WWW Documents by Morphemes", MEDINFO 2001 Proceedings of the 10th World Congress on Medical Informatics, Park I, IOS Press, Inc., pp. 266-270, 2001.
Senecal, Sylvain, "Consumers' Decision—Making Process and Their Online Shopping Behavior: A Clickstream Analysis", Jun. 1, 2004, pp. 1600-1607.
Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.
SharePoint Portal Server 2001 Planning and Installation Guide, http://www.microsoft.com/technet/prodtechnol/sppt/sharepoint/plan/planinst.mspx, printed on May 22, 2006, 86 pp.
Singhal, A. et al., "AT&T at TREC-9", Proceedings of the Ninth Text Retrieval Conference, NIST Special Publication 500-249, Online! 2001, pp. 103-105.
Singhal, A. et al., "Document Length Normalization", Cornell University, vol. 32, No. 5, 1996, pp. 619-633.
Smyth, Barry, "Relevance at a Distance—An Investigation of Distance-Biased Personalization on the Mobile Internet", no date, pp. 1-6.
Song et al., "Exploring URL Hit Priors for Web Search", vol. 3936, Springer Berlin/Heidelberg, 2006.
Sturdy, Derek, "Squirrels and nuts: metadata and knowledge management", Business Information Review, 18(4), pp. 34-42, Dec. 2001.
Svore, Krysta M. et al., "Improving Web Spam Classification using Rank-time Features," Published Date: May 8, 2007, http://www2007.org/workshops/paper_101.pdf, 8 pgs.
Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&dl=GUIDE&CFID=22810237&CFTOKEN=34449120, Nov. 5-11, 2006, pp. 585-593.
Voorhees, E., "Overview of TREC 2002", Gaithersburg, Maryland, Nov. 19-22, 15 pp.
Web Page "Reuters: Reuters Corpus", http://about.reuter.com/researchandstandards/corpus/, viewed Mar. 18, 2004.
Wen, Ji-Rong, "uery Clustering Using User Logs", Jan. 2002, pp. 59-81.
Westerveld, T. et al., "Retrieving Web pages using Content, Links, URLs and Anchors", Proceedings of the Tenth Text Retrieval Conference, NIST Special Publication, Online! Oct. 2001, pp. 1-10.
Wilkinson, R., "Effective Retrieval of Structured Documents", Annual ACM Conference on Research and Development, 1994, 7 pp.
Xue, Gui-Rong et al., "Optimizing Web Search Using Web Click-Through Data," http://people.cs.vt.edu/~xwensi/Publication/p118-xue.pdf, CIKM'04, Nov. 8-13, 2004, 9 pages.
Yi, Jeonghe,e et al., "Metadata Based Web Mining for Topic-Specific Information Gathering", IEEE, pp. 359-368, 2000.
Yi, Jeonghee, et al., "Using Metadata to Enhance Web Information Gathering", D.Suciu and G. Vossen (eds.): WebDB 2000, LNCS 1997, pp. 38-57, 2001.
Yuwono, Budi and Lee, Dik L., "Search and Ranking Algorithms for Locating Resources on the World Wide Web", IEEE, 1996, pp. 164-170.
Zamir, O. et al., "Grouper: A Dynamic Clustering Interface to Web Search Results", Computer Networks (Amsterdam, Netherlands: 1999), 31(11-16): 1361-1374, 1999.
Luxenburger et al., "Matching Task Profiles and User Needs in Personalized Web Search", CIKM Proceeding of the 17th ACM Conference on Information and Knowledge Mining, Oct. 2008, pp. 689-698.
Takeda, Takaharu et al., "Multi-Document Summarization by efficient text processing", *Proceedings of the FIT2007, Sixth Forum on Information Technology*, vol. 2, No. E-014, pp. 165-168, Information Processing Society of Japan, Japan, Aug. 22, 2007. (not an English document).
Utiyama, Masao et al., "Implementation of an IR package", *IPSJ SIG Notes*, vol. 2001, No. 74 (2001-FI-63-8), pp. 57-64, Information Processing Society of Japan, Japan, Jul. 25, 2001. (not an English document).
U.S. Official Action in U.S. Appl. No. 10/609,315 mailed Dec. 15, 2005, 13 pgs.
U.S. Official Action in U.S. Appl. No. 10/609,315 mailed Jun. 1, 2006, 12 pgs.
U.S. Official Action in U.S. Appl. No. 10/804,326 mailed Dec. 10, 2008, 7 pgs.
U.S. Official Action in U.S. Appl. No. 10/804,326 mailed Jun. 7, 2007, 19 pgs.
U.S. Official Action in U.S. Appl. No. 10/804,326 mailed Oct. 16, 2006, 18 pgs.
U.S. Official Action in U.S. Appl. No. 10/955,462 mailed May 11, 2007, 26 pgs.
U.S. Official Action in U.S. Appl. No. 10/955,462 mailed Nov. 3, 2006, 19 pgs.

(56) References Cited

OTHER PUBLICATIONS

U.S. Official Action in U.S. Appl. No. 10/955,462 mailed Sep. 10, 2007, 22 pgs.
U.S. Official Action in U.S. Appl. No. 10/955,983 mailed Dec. 18, 2008, 29 pgs.
U.S. Official Action in U.S. Appl. No. 10/955,983 mailed Jul. 21, 2008, 28 pgs.
U.S. Official Action in U.S. Appl. No. 10/955,983 mailed Jun. 10, 2009, 30 pgs.
U.S. Official Action in U.S. Appl. No. 10/955,983 mailed Mar. 22, 2007, 25 pgs.
U.S. Official Action in U.S. Appl. No. 10/955,983 mailed Nov. 13, 2007, 27 pgs.
U.S. Official Action in U.S. Appl. No. 10/981,962 mailed Apr. 30, 2007, 21 pgs.
U.S. Official Action in U.S. Appl. No. 10/981,962 mailed Apr. 5, 2006, 15 pgs.
U.S. Official Action in U.S. Appl. No. 10/981,962 mailed Mar. 17, 2008, 20 pgs.
U.S. Official Action in U.S. Appl. No. 10/981,962 mailed Sep. 21, 2006, 16 pgs.
U.S. Official Action in U.S. Appl. No. 11/019,091 mailed Apr. 3, 2008.
U.S. Official Action in U.S. Appl. No. 11/019,091 mailed Dec. 11, 2008, 24 pgs.
U.S. Official Action in U.S. Appl. No. 11/019,091 mailed Jun. 20, 2007.
U.S. Official Action in U.S. Appl. No. 11/019,091 mailed Sep. 1, 2009, 26 pgs.
U.S. Official Action in U.S. Appl. No. 11/073,381 mailed Apr. 12, 2010, 25 pgs.
U.S. Official Action in U.S. Appl. No. 11/073,381 mailed Apr. 15, 2009, 20 pgs.
U.S. Official Action in U.S. Appl. No. 11/073,381 mailed Feb. 23, 2011, 27 pgs.
U.S. Official Action in U.S. Appl. No. 11/073,381 mailed Jul. 10, 2008, 19 pgs.
U.S. Official Action in U.S. Appl. No. 11/073,381 mailed Sep. 13, 2010, 24 pgs.
U.S. Official Action in U.S. Appl. No. 11/073,381 mailed Sep. 18, 2007, 17 pgs.
U.S. Official Action in U.S. Appl. No. 11/073,381 mailed Sep. 29, 2009, 21 pgs.
U.S. Official Action in U.S. Appl. No. 11/206,286 mailed Dec. 24, 2008, 16 pgs.
U.S. Official Action in U.S. Appl. No. 11/206,286 mailed Jul. 14, 2008, 15 pgs.
U.S. Official Action in U.S. Appl. No. 11/238,906 mailed Dec. 18, 2009, 21 pgs.
U.S. Official Action in U.S. Appl. No. 11/238,906 mailed Jan. 8, 2008, 18 pgs.
U.S. Official Action in U.S. Appl. No. 11/238,906 mailed May 19, 2009, 20 pgs.
U.S. Official Action in U.S. Appl. No. 11/238,906 mailed Sep. 16, 2008, 17 pgs.
U.S. Official Action in U.S. Appl. No. 11/412,723 mailed Mar. 11, 2010, 20 pgs.
U.S. Official Action in U.S. Appl. No. 11/412,723 mailed Mar. 6, 2009, 22 pgs.
U.S. Official Action in U.S. Appl. No. 11/412,723 mailed May 28, 2008, 22 pgs.
U.S. Official Action in U.S. Appl. No. 11/412,723 mailed Sep. 3, 2009, 20 pgs.
U.S. Official Action in U.S. Appl. No. 11/874,579 mailed Jan. 14, 2011, 23 pgs.
U.S. Official Action in U.S. Appl. No. 11/874,579 mailed Jun. 22, 2010, 23 pgs.
U.S. Official Action in U.S. Appl. No. 11/874,579 mailed Mar. 28, 2014, 30 pgs.
U.S. Official Action in U.S. Appl. No. 11/874,844 mailed Nov. 13, 2009, 14 pgs.
U.S. Official Action in U.S. Appl. No. 12/207,910 mailed Jun. 7, 2011, 30 pgs.
U.S. Official Action in U.S. Appl. No. 12/828,508 mailed Aug. 13, 2010, 16 pgs.
U.S. Appl. No. 12/207,910, Amendment and Response filed Mar. 12, 2012, 13 pgs.
U.S. Appl. No. 12/207,910, Office Action mailed Dec. 12, 2011, 27 pgs.
U.S. Appl. No. 09/749,005, Amendment and Response filed Apr. 28, 2003, 12 pgs.
U.S. Appl. No. 09/749,005, Amendment and Response filed Jun. 21, 2004, 14 pgs.
U.S. Appl. No. 09/749,005, Notice of Allowance mailed Mar. 4, 2005, 4 pgs.
U.S. Appl. No. 09/749,005, Notice of Allowance mailed Apr. 7, 2005, 4 pgs.
U.S. Appl. No. 09/749,005, Notice of Allowance mailed Aug. 30, 2004, 9 pgs.
U.S. Appl. No. 09/749,005, Office Action mailed Oct. 28, 2002, 12 pgs.
U.S. Appl. No. 09/749,005, Office Action mailed Jun. 12, 2003, 10 pgs.
U.S. Appl. No. 10/959,330, Amendment and Response filed Jan. 6, 2006, 10 pgs.
U.S. Appl. No. 10/959,330, Amendment and Response filed Sep. 14, 2005, 12 pgs.
U.S. Appl. No. 10/959,330, Notice of Allowance mailed Apr. 3, 2006, 6 pgs.
U.S. Appl. No. 10/959,330, Office Action mailed Dec. 14, 2005, 6 pgs.
U.S. Appl. No. 10/959,330, Office Action mailed Jun. 27, 2005, 10 pgs.
U.S. Appl. No. 10/968,716, Amendment and Response filed Jan. 25, 2008, 8 pgs.
U.S. Appl. No. 10/968,716, Amendment and Response filed Jun. 15, 2007, 13 pgs.
U.S. Appl. No. 10/968,716, Amendment and Response filed Aug. 13, 2007, 6 pgs.
U.S. Appl. No. 10/968,716, Notice of Allowance mailed Jun. 2, 2008, 8 pgs.
U.S. Appl. No. 10/968,716, Office Action mailed Oct. 26, 2007, 14 pgs.
U.S. Appl. No. 10/968,716, Office Action mailed Mar. 15, 2007, 13 pgs.
U.S. Appl. No. 12/101,951, Amendment and Response filed Jan. 9, 2012, 10 pgs.
U.S. Appl. No. 12/101,951, Amendment and Response filed Dec. 3, 2010, 16 pgs.
U.S. Appl. No. 12/101,951, Amendment and Response filed Jun. 3, 2011, 12 pgs.
U.S. Appl. No. 12/101,951, Office Action mailed Aug. 3, 2010, 26 pgs.
U.S. Appl. No. 12/101,951, Office Action mailed Oct. 7, 2011, 28 pgs.
U.S. Appl. No. 12/101,951, Office Action mailed Feb. 24, 2012, 28 pgs.
U.S. Appl. No. 12/101,951, Office Action mailed Mar. 4, 2011, 25 pgs.
U.S. Appl. No. 12/101,951, Corrected Notice of Allowance mailed Sep. 5, 2013, 2 pages.
U.S. Appl. No. 12/101,951, Corrected Notice of Allowability mailed Sep. 18, 2013, 2 pages.
U.S. Appl. No. 12/101,951, Amendment filed Oct. 30, 2013, 8 pgs.
U.S. Appl. No. 12/101,951, Notice of Allowance mailed Mar. 26, 2014, 8 pgs.
U.S. Appl. No. 12/207,910, Amendment and Response filed Sep. 7, 2011, 14 pgs.
U.S. Appl. No. 12/359,939, Amendment and Response filed Mar. 23, 2012, 11 pgs.
U.S. Appl. No. 12/359,939, Office Action mailed Jul. 17, 2012, 21 pgs.

(56) References Cited

OTHER PUBLICATIONS

U.S. Appl. No. 12/359,939, Amendment and Response filed Oct. 11, 2013, 11 pgs.

12/359,939, After-final Amendment filed Mar. 11, 2014, 10 pgs.

U.S. Appl. No. 12/359,939, Office Action mailed Apr. 9, 2014, 18 pgs.

U.S. Appl. No. 09/493,748, Advisory Action mailed Jan. 4, 2005, 2 pgs.

U.S. Appl. No. 09/493,748, Amendment and Response filed Oct. 12, 2004, 18 pgs.

U.S. Appl. No. 09/493,748, Amendment and Response filed Apr. 20, 2004, 16 pgs.

U.S. Appl. No. 09/493,748, Final Office Action mailed Jul. 20, 2004, 14 pgs.

U.S. Appl. No. 09/493,748, Office Action mailed Sep. 25, 2003, 11 pgs.

U.S. Appl. No. 09/603,695, Advisory Action mailed Aug. 27, 2004, 3 pgs.

U.S. Appl. No. 09/603,695, Amendment and Response filed Nov. 5, 2004, 9 pgs.

U.S. Appl. No. 09/603,695, Amendment and Response filed Feb. 27, 2004, 13 pgs.

U.S. Appl. No. 09/603,695, Amendment and Response filed Jul. 22, 2004, 13 pgs.

U.S. Appl. No. 09/603,695, Final Office Action mailed May 18, 2004, 12 pgs.

U.S. Appl. No. 09/603,695, Notice of Allowance mailed Dec. 21, 2004, 8 pgs.

U.S. Appl. No. 09/603,695, Office Action mailed Nov. 7, 2003, 11 pgs.

U.S. Appl. No. 10/609,315, Amendment and Response filed Nov. 29, 2006, 23 pgs.

U.S. Appl. No. 10/609,315, Amendment and Response filed Mar. 17, 2006, 14 pgs.

U.S. Appl. No. 10/609,315, Notice of Allowance mailed Jan. 24, 2007, 6 pgs.

U.S. Appl. No. 10/609,315, Notice of Allowance mailed May 30, 2007, 4 pgs.

U.S. Appl. No. 10/804,326, Advisory Action mailed Feb. 21, 2008, 3 pgs.

U.S. Appl. No. 10/804,326, Amendment and Response filed Feb. 11, 2008, 28 pgs.

U.S. Appl. No. 10/804,326, Amendment and Response filed Mar. 16, 2007, 21 pgs.

U.S. Appl. No. 10/804,326, Amendment and Response filed Mar. 9, 2009, 8 pgs.

U.S. Appl. No. 10/804,326, Amendment and Response filed Jun. 10, 2008, 27 pgs.

U.S. Appl. No. 10/804,326, Amendment and Response filed Sep. 7, 2007, 26 pgs.

U.S. Appl. No. 10/804,326, Final Office Action mailed Dec. 11, 2007, 24 pgs.

U.S. Appl. No. 10/804,326, Notice of Allowance mailed May 29, 2009, 8 pgs.

U.S. Appl. No. 10/951,123, Advisory Action mailed Dec. 31, 2007, 3 pgs.

U.S. Appl. No. 10/951,123, Amendment and Response filed Jan. 14, 2008, 10 pgs.

U.S. Appl. No. 10/951,123, Amendment and Response filed Dec. 13, 2007, 10 pgs.

U.S. Appl. No. 10/951,123, Amendment and Response filed Apr. 25, 2007, 15 pgs.

U.S. Appl. No. 10/951,123, Amendment and Response filed Apr. 6, 2009, 18 pgs.

U.S. Appl. No. 10/951,123, Amendment and Response filed Sep. 17, 2008, 15 pgs.

U.S. Appl. No. 10/951,123, Final Office Action mailed Jan. 5, 2009, 23 pgs.

U.S. Appl. No. 10/951,123, Final Office Action mailed Jul. 13, 2007, 15 pgs.

U.S. Appl. No. 10/951,123, Notice of Allowance mailed Jun. 25, 2009, 5 pgs.

U.S. Appl. No. 10/951,123, Office Action mailed Jan. 25, 2007, 16 pgs.

U.S. Appl. No. 10/951,123, Office Action mailed Mar. 18, 2008, 20 pgs.

U.S. Appl. No. 10/955,462 Amendment and Response filed Mar. 10, 2008, 17 pgs.

U.S. Appl. No. 10/955,462 Amendment and Response filed Mar. 5, 2007, 18 pgs.

U.S. Appl. No. 10/955,462 Amendment and Response filed Aug. 8, 2007, 21 pgs.

U.S. Appl. No. 10/955,462 Notice of Allowance mailed Jan. 25, 2010, 6 pgs.

U.S. Appl. No. 10/955,462 Notice of Allowance mailed Oct. 16, 2009, 7 pgs.

U.S. Appl. No. 10/955,462 Notice of Allowance mailed Feb. 24, 2009, 7 pgs.

U.S. Appl. No. 10/955,462 Notice of Allowance mailed Jun. 10, 2009, 6 pgs.

U.S. Appl. No. 10/955,462 Notice of Allowance mailed Jun. 17, 2008, 12 pgs.

U.S. Appl. No. 10/955,462 Notice of Allowance mailed Sep. 23, 2008, 6 pgs.

U.S. Appl. No. 10/955,983, Amendment and Response filed Oct. 13, 2009, 12 pgs.

U.S. Appl. No. 10/955,983, Amendment and Response filed Mar. 18, 2009, 18 pgs.

U.S. Appl. No. 10/955,983, Amendment and Response filed May 13, 2008, 14 pgs.

U.S. Appl. No. 10/955,983, Amendment and Response filed Aug. 22, 2007, 13 pgs.

U.S. Appl. No. 10/955,983, Amendment and Response filed Sep. 25, 2008, 13 pgs.

U.S. Appl. No. 10/955,983, Notice of Allowance mailed Jan. 12, 2010, 10 pgs.

U.S. Appl. No. 10/955,983, Notice of Allowance mailed Jun. 4, 2010, 5 pgs.

U.S. Appl. No. 10/956,891, Advisory Action mailed Mar. 21, 2008, 3 pgs.

U.S. Appl. No. 10/956,891, Amendment and Response filed Oct. 16, 2008, 12 pgs.

U.S. Appl. No. 10/956,891, Amendment and Response filed Mar. 3, 2008, 11 pgs.

U.S. Appl. No. 10/956,891, Amendment and Response filed May 1, 2008, 11 pgs.

U.S. Appl. No. 10/956,891, Amendment and Response filed Jun. 1, 2009, 12 pgs.

U.S. Appl. No. 10/956,891, Amendment and Response filed Aug. 22, 2007, 11 pgs.

U.S. Appl. No. 10/956,891, Final Office Action filed Nov. 1, 2007, 18 pgs.

U.S. Appl. No. 10/956,891, Final Office Action mailed Dec. 31, 2008, 16 pgs.

U.S. Appl. No. 10/956,891, Notice of Allowance mailed Aug. 20, 2009, 7 pgs.

U.S. Appl. No. 10/956,891, Office Action mailed Mar. 22, 2007, 15 pgs.

U.S. Appl. No. 10/956,891, Office Action mailed Jul. 16, 2008, 19 pgs.

U.S. Appl. No. 10/981,962, Advisory Action mailed Jan. 23, 2007, 3 pgs.

U.S. Appl. No. 10/981,962, Amendment and Response filed Nov. 27, 2007, 10 pgs.

U.S. Appl. No. 10/981,962, Amendment and Response filed Feb. 7, 2007, 1 pg.

U.S. Appl. No. 10/981,962, Amendment and Response filed Jun. 27, 2006, 23 pgs.

U.S. Appl. No. 10/981,962, Amendment and Response filed Jul. 27, 2007, 16 pgs.

U.S. Appl. No. 10/981,962, Amendment and Response filed Aug. 18, 2008, 10 pgs.

(56) References Cited

OTHER PUBLICATIONS

U.S. Appl. No. 10/981,962, Notice of Allowance mailed Jan. 29, 2009, 6 pgs.
U.S. Appl. No. 10/981,962, Notice of Allowance mailed Jan. 9, 2009, 6 pgs.
U.S. Appl. No. 10/981,962, Notice of Allowance mailed Oct. 15, 2008, 6 pgs.
U.S. Appl. No. 10/981,962, Notice of Allowance mailed May 8, 2009, 6 pgs.
U.S. Appl. No. 10/981,962, Notice of Allowance mailed Aug. 20, 2009, 6 pgs.
U.S. Appl. No. 10/981,962, Notice of Allowance mailed Sep. 11, 2008, 14 pgs.
U.S. Appl. No. 10/981,962, Office Action mailed Nov. 13, 2007, 3 pgs.
U.S. Appl. No. 11/019,091, Amendment and Response filed Oct. 3, 2008, 15 pgs.
U.S. Appl. No. 11/019,091, Amendment and Response filed Nov. 30, 2009, 11 pgs.
U.S. Appl. No. 11/019,091, Amendment and Response filed Dec. 20, 2007, 23 pgs.
U.S. Appl. No. 11/019,091, Amendment and Response filed Jun. 11, 2009, 12 pgs.
U.S. Appl. No. 11/019,091, Notice of Allowance mailed Dec. 23, 2009, 16 pgs.
U.S. Appl. No. 11/022,054, Amendment and Response filed Aug. 24, 2007, 19 pgs.
U.S. Appl. No. 11/022,054, Notice of Allowance mailed Nov. 15, 2007, 10 pgs.
U.S. Appl. No. 11/022,054, Office Action mailed Jun. 19, 2007, 19 pgs.
U.S. Appl. No. 11/073,381, Amendment and Response filed Dec. 13, 2010, 10 pgs.
U.S. Appl. No. 11/073,381, Amendment and Response filed Dec. 28, 2009, 9 pgs.
U.S. Appl. No. 11/073,381, Amendment and Response filed Dec. 9, 2008, 11 pgs.
U.S. Appl. No. 11/073,381, Amendment and Response filed Mar. 18, 2008, 14 pgs.
U.S. Appl. No. 11/073,381, Amendment and Response filed Jul. 15, 2009, 10 pgs.
U.S. Appl. No. 11/073,381, Amendment and Response filed Jul. 9, 2010, 10 pgs.
U.S. Appl. No. 11/206,286, Amendment and Response filed Mar. 24, 2009, 13 pgs.
U.S. Appl. No. 11/206,286, Amendment and Response filed Jul. 22, 2009, 3 pgs.
U.S. Appl. No. 11/206,286, Amendment and Response filed Sep. 30, 2008, 11 pgs.
U.S. Appl. No. 11/206,286, Notice of Allowance mailed Apr. 22, 2009, 9 pgs.
U.S. Appl. No. 11/231,955, filed Sep. 21, 2005, Amendment and Response filed Apr. 30, 2008, 12 pgs.
U.S. Appl. No. 11/231,955, filed Sep. 21, 2005, Amendment and Response filed Sep. 15, 2008, 16 pgs.
U.S. Appl. No. 11/231,955, filed Sep. 21, 2005, Final Office Action mailed Jun. 4, 2008, 8 pgs.
U.S. Appl. No. 11/231,955, filed Sep. 21, 2005, Notice of Allowance mailed Oct. 21, 2008, 5 pgs.
U.S. Appl. No. 11/231,955, filed Sep. 21, 2005, Office Action mailed Jan. 30, 2008, 8 pgs.
U.S. Appl. No. 11/238,906, Amendment and Response filed Feb. 26, 2009, 9 pgs.
U.S. Appl. No. 11/238,906, Amendment and Response filed May 28, 2010, 9 pgs.
U.S. Appl. No. 11/238,906, Amendment and Response filed Jun. 9, 2008, 10 pgs.
U.S. Appl. No. 11/238,906, Amendment and Response filed Sep. 1, 2009, 9 pgs.

U.S. Appl. No. 11/238,906, Notice of Allowance mailed Jul. 22, 2010, 10 pgs.
U.S. Appl. No. 11/238,906, Notice of Allowance mailed Aug. 5, 2010, 4 pgs.
U.S. Appl. No. 11/412,723, Amendment and Response filed Nov. 26, 2008, 10 pgs.
U.S. Appl. No. 11/412,723, Amendment and Response filed Nov. 30, 2009, 10 pgs.
U.S. Appl. No. 11/412,723, Amendment and Response filed May 31, 2010, 11 pgs.
U.S. Appl. No. 11/412,723, Amendment and Response filed Jun. 23, 2009, 11 pgs.
U.S. Appl. No. 11/412,723, Notice of Allowance mailed Jul. 9, 2010, 10 pgs.
U.S. Appl. No. 11/874,579, filed Oct. 18, 2007, Amendment and Response filed Nov. 22, 2010, 8 pgs.
U.S. Appl. No. 11/874,579, filed Oct. 18, 2007, Amendment and Response filed May 16, 2011, 14 pgs.
U.S. Appl. No. 11/874,579, filed Oct. 18, 2007, Office Action mailed Sep. 10, 2013, 27 pgs.
U.S. Appl. No. 11/874,579, filed Oct. 18, 2007, Amendment and Response filed Dec. 10, 2013, 17 pgs.
U.S. Appl. No. 11/874,844, Amendment and Response filed Mar. 15, 2010, 16 pgs.
U.S. Appl. No. 11/874,844, Notice of Allowance mailed May 18, 2010, 9 pgs.
U.S. Appl. No. 11/874,844, Notice of Allowance mailed Jun. 25, 2010, 2 pgs.
U.S. Appl. No. 12/359,939 filed Jan. 26, 2009, Amendment and Response filed May 23, 2011, 8 pgs.
U.S. Appl. No. 12/359,939, filed Jan. 26, 2009, Amendment and Response filed Jul. 21, 2011, 8 pgs.
U.S. Appl. No. 12/359,939, filed Jan. 26, 2009, Amendment and Response filed Sep. 28, 2011, 14 pgs.
U.S. Appl. No. 12/359,939, filed Jan. 26, 2009, Office Action mailed Jan. 21, 2011, 15 pgs.
U.S. Appl. No. 12/359,939, filed Jan. 26, 2009, Office Action mailed Dec. 6, 2011, 14 pgs.
U.S. Appl. No. 12/828,508, Amendment and Response filed Jan. 13, 2011, 11 pgs.
U.S. Appl. No. 12/828,508, Amendment and Response filed Sep. 6, 2011, 3 pgs.
U.S. Appl. No. 12/828,508, Notice of Allowance mailed Mar. 31, 2011, 9 pgs.
U.S. Appl. No. 12/828,508, Notice of Allowance mailed Jul. 6, 2011, 8 pgs.
U.S. Appl. No. 12/101,951, Amendment and Response filed Jun. 21, 2012, 8 pgs.
U.S. Appl. No. 12/101,951, Advisory Action mailed Jun. 27, 2012, 3 pgs.
U.S. Appl. No. 12/101,951, Notice of Allowance mailed Jul. 30, 2013, 5 pgs.
U.S. Appl. No. 12/101,951, Notice of Allowance mailed Sep. 5, 2013, 2 pgs.
U.S. Appl. No. 12/101,951, Notice of Allowance mailed Sep. 18, 2013, 2 pgs.
U.S. Appl. No. 12/101,951, Notice of Allowance mailed Dec. 16, 2013, 3 pgs.
U.S. Appl. No. 12/101,951, Petition and Response filed Dec. 16, 2013, 5 pgs.
U.S. Appl. No. 12/359,939, filed Jan. 26, 2009, Amendment and Response filed Oct. 26, 2012, 11 pgs.
U.S. Appl. No. 12/359,939, filed Jan. 26, 2009, Amendment and Response filed Nov. 29, 2012, 9 pgs.
U.S. Appl. No. 12/359,939, Office Action mailed Jun. 17, 2013, 19 pgs.
U.S. Appl. No. 12/359,939, Office Action mailed Jan. 2, 2014, 18 pgs.
U.S. Appl. No. 12/791,756, Amendment and Response filed Apr. 30, 2012, 12 pgs.
U.S. Appl. No. 12/791,756, Amendment and Response filed Sep. 26, 2012, 14 pgs.
U.S. Appl. No. 12/791,756, Office Action mailed Jan. 31, 2012, 18 pgs.

(56) References Cited

OTHER PUBLICATIONS

U.S. Appl. No. 12/791,756, Office Action mailed Jun. 26, 2012, 26 pgs.
U.S. Appl. No. 12/791,756, Office Action mailed Oct. 3, 2013, 32 pgs.
U.S. Appl. No. 12/791,756, Amendment and Response filed Dec. 24, 2013, 19 pgs.
U.S. Appl. No. 12/791,756, Notice of Allowance mailed Feb. 7, 2014, 10 pgs.
U.S. Appl. No. 13/360,536, Office Action mailed Mar. 20, 2014, 14 pgs.
U.S. Appl. No. 09/493,748, filed Jan. 28, 2000 entitled "Adaptive Web Crawling Using a Statistical Model", 64 pgs.
Australian Exam Report in Application No. 2008 00521-7, mailed Mar. 11, 2009, 4 pgs.
Australian First Examiners Report in 2006279520 mailed Oct. 5, 2010.
Australian First Examiner's Report in 2009234120 mailed Feb. 26, 2014, 3 pgs.
Australian Notice of Allowance in Application 2006279520, mailed Mar. 2, 2011, 3 pgs.
Canadian Office Action in Application 2618854, mailed Mar. 27, 2013, 2 pgs.
Canadian Notice of Allowance in Application 2618854, received Jan. 13, 2014, 1 pg.
Chinese 1st Office Action in Application 200980112928.6, mailed Jun. 8, 2012, 8 pgs.
Chinese 2nd Office Action in Application 200980112928.6, mailed Mar. 4, 2013, 9 pgs.
Chinese Notice of Allowance in Application 2009801129286, mailed Aug. 30, 2013, 4 pgs.
Chinese Application 200510088213.5, Notice of Allowance mailed Apr. 20, 2010, 4 pgs.
Chinese Application No. 200510088212.0, First Office Action mailed Jul. 4, 2008, 10 pgs.
Chinese Application No. 200510088212.0, Notice of Allowance mailed Jan. 8, 2010, 4 pgs.
Chinese Decision on Reexamination in 200680029645.1, mailed Dec. 14, 2012, 15 pgs.
Chinese Decision on Re-Examination in Application 200510084707.6 mailed Aug. 22, 2011, 12 pgs.
Chinese Decision on Rejection in 200680029645.1 mailed Aug. 12, 2010.
Chinese Final Rejection in 200510084707.6 mailed Aug. 21, 2009, 13 pgs.
Chinese Final Rejection in 200510088213.5 mailed Mar. 6, 2009.
Chinese First Office Action in 200510084707.6 mailed Mar. 28, 2008, 10 pgs.
Chinese First Office Action in 200680034531.6 mailed Sep. 11, 2009, 7 pgs.
Chinese First Office Action in Chinese Application/Patent No: 200880112416.5, mailed Aug. 12, 2011, 11 pgs.
Chinese First Official Action in 200510088213.5 mailed May 9, 2008.
Chinese First Official Action in 200510088527.5 mailed Apr. 18, 2008.
Chinese First Official Action in 200680029645.1 mailed Jun. 19, 2009.
Chinese First Official Action in 200680035828.4 mailed Jun. 19, 2009.
Chinese Notice of Allowance in 200510088527.5 mailed Jul. 24, 2009, 4 pgs.
Chinese Notice of Allowance in 200680034531.6 mailed Oct. 14, 2010, 6 pgs.
Chinese Notice of Allowance in Application 200510084707.6, mailed Sep. 25, 2012, 4 pgs.
Chinese Notice of Allowance in Application 200880112416.5, mailed Jul. 18, 2012, 4 pgs.
Chinese Notice of Reexamination in Application 200680029645.1, mailed Aug. 20, 2012, 11 pgs.
Chinese Second Office Action in 200510084707.6 mailed Nov. 7, 2008, 10 pgs.
Chinese Second Office Action in 200680029645.1 mailed Apr. 6, 2010.
Chinese Second Official Action in 200510088213.5 mailed Oct. 10, 2008.
Chinese Second Official Action in 200510088527.5 mailed Dec. 26, 2008.
Chinese Third Office Action in 200510084707.6 mailed Feb. 20, 2009, 12 pgs.
Chinese Third Official Action in 200510088213.5 mailed Sep. 4, 2009.
Egyptian Official Action in PCT 269/2008 mailed Feb. 1, 2010.
EP 2nd Office Action in Application 05105672.9, mailed Oct. 15, 2009, 4 pgs.
EP Communication to cancel the oral summons in Application 05105048.2, mailed Jul. 16, 2012, 1 pg.
EP Exam Report in EP 00309121.2-1522 mailed Jul. 4, 2003.
EP Exam Report in EP 00309121.2-1527 mailed Feb. 8, 2007.
EP Exam Report in EP 00309121.2-1527 mailed Jun. 16, 2004.
EP Exam Report in EP 05105048.2-2201 mailed Apr. 23, 2007.
EP Examination Report in Application 05105672.9, mailed Oct. 24, 2006, 4 pgs.
EP Notice of Allowance in Application 05105048.2, mailed Aug. 13, 2012, 8 pgs.
EP Office Action in Application 05105107.6, mailed Mar. 28, 2008, 6 pgs.
EP Result of consultation in Application 05105048.2, mailed Aug. 8, 2012, 3 pgs.
EP Search Report in Application 05105107.6, mailed Apr. 7, 2006, 3 pgs.
EP Search Report in Application 05105672.9, mailed Feb. 6, 2006, 3 pgs.
EP Search Report in EP 00309121 mailed Jul. 18, 2002.
EP Search Report in EP 05105048 mailed Jan. 17, 2006.
EP Search Report in EP 05105110 dated Aug. 11, 2006.
EP Summons to Attend Oral Proceedings in EP 05105048.2-2201 mailed Apr. 3, 2012.
European Communication in Application 05105107.6, mailed Dec. 17, 2012, 4 pgs.
European Extended Search Report in Application 06836141.9 mailed Dec. 27, 2011, 8 pgs.
European Extended Search Report in Application 097308084, mailed Oct. 2, 2012, 7 pgs.
European Notice of Allowance in Application 00309121.2, mailed Jun. 15, 2009, 5 pgs.
European Official Action in 05105110.0-1527 mailed Aug. 4, 2010.
European Search Report in 08840594.9-2201 mailed Feb. 23, 2011.
European Search Report in 08840594.9-2201 mailed Jan. 21, 2011.
European Search Report in Application 06789800.7 mailed Oct. 13, 2011, 11 pgs.
Extended European Search Report in Application 06804098.9, mailed Dec. 19, 2011, 7 pgs.
European Report on Result of Consultation in Application EP 06836141.9, mailed Jan. 9, 2013, 3 pgs.
European Notice of Allowance in Application EP 06836141.9, mailed Jan. 31, 2013, 6 pgs.
Indonesian Notice of Allowance in Application W00200800848 mailed Jun. 9, 2011, 4 pgs.
Japanese Appeal Decision in 2008-527094 (Appeal No. 2010-011037) mailed Nov. 4, 2011—31 pgs., only first page translated.
Japanese Final Notice of Rejection in Application No. 2005-187816 mailed Mar. 16, 2012, 5 pgs.
Japanese Final Rejection in 2005-175172 mailed Jun. 7, 2011, 5 pgs.
Japanese Final Rejection in 2008-527094 mailed Jan. 22, 2010.
Japanese Final Rejection in JP Application 2008-532469, mailed Jan. 29, 2010, 19 pgs.
Japanese Notice of Allowance in 2005-175172 mailed Mar. 6, 2012, 6 pgs.
Japanese Notice of Allowance in 2005-175173 mailed Jun. 7, 2011, 6 pgs.
Japanese Notice of Allowance in Application 2011-021985, mailed Dec. 25, 2012, 6 pgs.

(56) References Cited

OTHER PUBLICATIONS

Japanese Notice of Allowance in JP Application 2008-532469, mailed Feb. 22, 2011, 6 pgs.
Japanese Notice of Final Rejection in 2005-175174, mailed Aug. 5, 2011, 5 pgs.
Japanese Notice of Rejection in 2005-175172 mailed Sep. 28, 2010.
Japanese Notice of Rejection in 2005-175173 mailed Oct. 1, 2010.
Japanese Notice of Rejection in 2005-175174, mailed Oct. 29, 2010, 13 pgs.
Japanese Notice of Rejection in 2008-527094 mailed Sep. 11, 2009.
Japanese Notice of Rejection in Application No. 2005-187816 mailed May 20, 2011, 13 pgs.
Japanese Office Action in JP Application 2008-532469, mailed Sep. 29, 2009, 18 pgs.
Japanese Office Action in JP Application 2011-527079, mailed Oct. 8, 2013, 15 pgs.
Japanese Notice of Allowance in JP Application 2011-194741, mailed Sep. 6, 2013, 4 pgs.
Japanese Office Action in JP Application 2011-266249, mailed Sep. 2, 2013, 7 pgs.
Japanese Notice of Rejection in Application 2011-194741, mailed May 14, 2013, 4 pgs.
Japanese Notice of Rejection in Application 2011-504031, mailed May 14, 2013, 4 pgs.
Japanese Notice of Allowance in JP Application 2011-504031, mailed Jan. 30, 2014, 4 pgs.
Japanese Appeal Decision and Notice of Allowance in Application 2005-175174, mailed Jun. 18, 2013, 4 pgs.
Korean Official Action in 2005-0057199 mailed Aug. 4, 2011, pgs.
Korean Official Action in 2005-0057199 mailed Mar. 26, 2012, 5 pgs.
Korean Notice of Preliminary Rejection in Application 10-2008-7007702, mailed Feb. 4, 2013, 4 pgs.
Korean Notice of Preliminary Rejection in Application 10-2008-7003121, mailed Jan. 21, 2013, 11 pgs.
Korean Notice of Preliminary Rejection in Application 1020087006775, mailed Feb. 4, 2013, 1 pg.
Malaysia Adverse Report in Application PI20063920, mailed Jul. 31, 2012, 3 pgs.
Malaysia Adverse Search Report in Application PI20080638, mailed Jul. 31, 2012, 4 pgs.
Malaysian Substantive Examination Report in Application PI 20063920, mailed Jul. 31, 2012, 3 pgs.
Malaysian Notice of Allowance in Application PI20063920, mailed Dec. 14, 2012, 2 pgs.
Malaysian Notice of Allowance in Application PI 20080638, mailed Jun. 28, 2013, 2 pgs.
Mexican Office Action with Summary in PA/a/2008/02173 mailed Jun. 5, 2012, 7 pgs.
New Zealand Examination Report in Application No. 566532, mailed Oct. 15, 2009, 2 pgs.
PCT International Search Report in PCT/US2009/036597 dated Aug. 28, 2009, 11 pgs.
PCT International Search Report, Application No. PCT/US2006/037206, mailed Jan. 16, 2007, 10 pgs.
PCT Search Report in PCT/US2006/031965 mailed Jan. 11, 2007.
PCT Search Report in PCT/US2008/011894 mailed Feb. 27, 2009, 12 pgs.
PCT Search Report in PCT/US2009/063333 dated Apr. 22, 2010, 10 pgs.
PCT International Search Report and Written Opinion in Application PCT/US2011/033125, mailed Dec. 15, 2011, 8 pgs.
PCT Search Report in Application PCT/US2013/022825, mailed Apr. 30, 2013, 11 pgs.
Philippines Office Action in 1-2008-500189 mailed Mar. 11, 2011, 1 page.
Philippines Official Action in 1-2008-500189 mailed Jun. 22, 2011, 1 page.
Philippines Official Action in 1-2008-500433 mailed Mar. 24, 2011, 1 page.
Philippines Letters Patent in Application 12008500189, issued Jan. 6, 2012, 2 pgs.
Russian Application No. 2008105758, Notice of Allowance mailed Dec. 16, 2010, 5 pgs.
Russian Notice of Allowance in Application No. 2008110731/08, mailed Oct. 25, 2010, 7 pgs.
Russian Official Action in 2008105758 mailed Jun. 29, 2010.
Russian Official Action in 2010141559, mailed Jan. 28, 2013, 4 pgs. (in foreign language).
Russian Notice of Allowance in Application 2011108842, mailed Dec. 16, 2013, 7 pgs. (English translation).
Russian Office Action in Application 2010141559, mailed Jan. 28, 2013, 6 pgs.
Russian Notice of Allowance in Application No. 2010141559, mailed Jun. 27, 2013, 6 pgs.
South Africa Notice of Allowance in Application No. 2008/02250 mailed Jul. 23, 2009, 1 page.
Taiwanese Search Report in Application 95129817, mailed Oct. 19, 2012, 1 pg.
Taiwanese Notice of Allowance in Application 95129817, mailed Jan. 29, 2013, 4 pgs.
Japanese Patent and Trademark Office, Japanese Final Rejection in Application 2011-266249, mailed Apr. 7, 2014, 4 pgs.
U.S. Appl. No. 12/101,951, Notice of Allowance mailed Apr. 25, 2014, 4 pgs.
U.S. Appl. No. 12/207,910, Notice of Allowance mailed Apr. 16, 2014, 19 pgs.
U.S. Appl. No. 12/791,756, Amendment and Response after Allowance filed Apr. 4, 2014, 3 pgs.
U.S. Appl. No. 12/207,910, Notice of Allowance mailed Jun. 20, 2014, 15 pgs.
U.S. Appl. No. 12/359,939, Amendment and Response filed Jun. 27, 2014, 11 pgs.
U.S. Appl. No. 13/360,536, Amendment and Response filed Jun. 20, 2014, 13 pgs.
Australian Patent Office, Australian Lapsing Notice in Application 2009290574, mailed May 19, 2014, 1 page.
Australian Patent Office, Australian Notice of Allowance in Application 2009234120, mailed May 8, 2014, 2 pgs.

\* cited by examiner

SYSTEM AND METHOD FOR SCOPING SEARCHES USING INDEX KEYS

CROSS REFERENCE TO RELATED APPLICATIONS

This application claims priority to U.S. patent application Ser. No. 10/951,123, filed Sep. 27, 2004, entitled SYSTEM AND METHOD FOR SCOPING SEARCHES USING INDEX KEYS, the disclosure of which is incorporated by reference herein in its entirety.

BACKGROUND OF THE INVENTION

Searches among networks and file systems for content have been provided in many forms but most commonly by a variant of a search engine. A search engine is a program that searches documents for specified keywords and returns a list of the documents where the keywords were found.

Typically, a search engine works by sending out a spider to fetch as many documents as possible. Another program, called an indexer, then reads these documents and creates an index based on the words contained in each document. An index is a list of keys or keywords, each of which identifies a unique record. Indices make it faster to find specific records and to sort records by the index field. A search engine uses an algorithm to create its indices such that, ideally, only meaningful results are returned for each query by a client or user.

A fairly consistent aspect of these queries is the use of a keyword or index key. Whether a user enters a search query as a long text string or a connection of Boolean operators, the search engine examines all records for the keywords entered corresponding to documents that match the keywords. A subset of the records is then returned that satisfies the Boolean operator constraints or corresponds to the long text string. Examining these records can be a time consuming and expensive operation. In addition, a client may not desire a full record search for documents containing a particular keyword.

SUMMARY OF THE INVENTION

Embodiments of the present invention are related to a system and method that solves for the above mentioned limitations by providing a class of index keys, referred to as scope keys, that define a scope of the search rather than merely providing a keyword. When a scope key is entered in a search query, the scope key limits the scope of the index records searched. For example, a scope key can limit the scope of a search by limiting the search results to a certain file type, such as .mpg files. Another scope key can limit the scope of search according to a URL (Uniform Resource Locator) so that only documents under that URL are searched. Still another scope key may limit the scope of the search to a particular database on the user's computer or other networked computer. The present invention therefore solves the above-mentioned problem by significantly reducing the time and expense of a search by allowing the user to limit the scope for the search using a particular class of index keys.

In accordance with another aspect of the present invention, compound scopes are also recognized and stored. This additional index partition includes scope definitions that are combinations of the basic scopes. The documents corresponding to these compound scopes have already been resolved, allowing for faster searches when these compound scopes are referenced.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
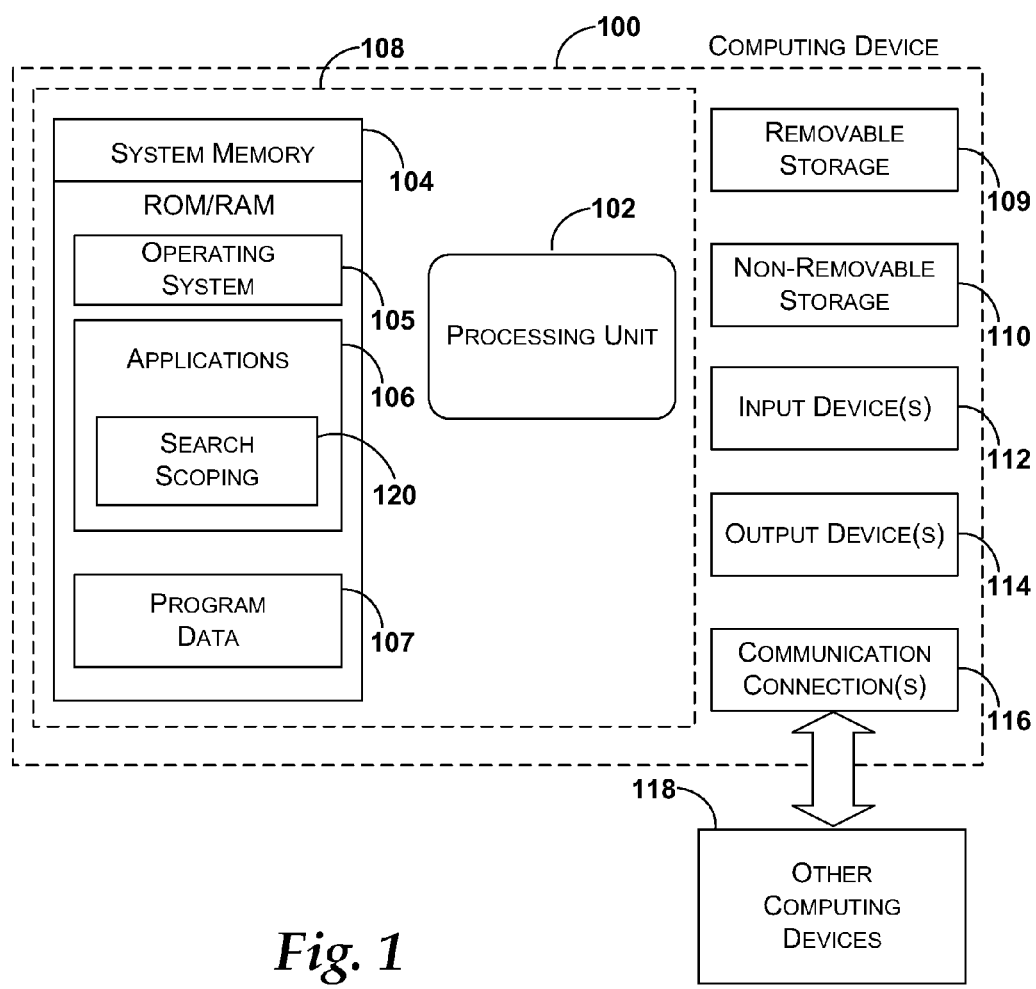
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a search scoping application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiment for Scoping Searches

Throughout the following description and the claims, the term "document" refers to any possible resource that may be returned as the result of a search query or crawl of a network, such as network documents, files, folders, web pages, and other resources. The term "index key" refers to any keyword or key associated with a search that is used to target a set of documents in a search query or creation of an index. The term "scope key" refers to any index key that may be used to narrow the scope of the search such that the number of documents to be searched is reduced before the search is commenced. The scope of the search can be narrowed according to attributes such as file types, locations such as certain databases or URLs, or by other criteria that reduces the number of documents to be searched.

Embodiments of the present invention are related to increasing the query efficiency of all scoped queries by representing the scopes of each item in the index with scope keys and adding the appropriate scope key to the query as another restriction. This method is provided in contrast to a method that re-calculates the scope condition for every document matching the user keywords based on document properties (e.g., URL or other metadata). Since most scopes will represent a narrow slice of the set of all crawled items, the efficiency of scoped queries is increased by a factor less than but related to the narrowness of that slice. In one example, an administrator of a portal (i.e., a web site that offers a host of services including searches) may determine that the users of the portal are especially interested in functional specs. It may therefore be advantageous to provide a search mechanism that only searches through these specs for keywords without sifting through the chaff of those words in other documents. Through an administrative interface the administrator may define a scope having a rule: profile="spec", or this scope may already be defined as a basic scope. The administrator may use the basic scope to define a compound scope having a rule: profile="spec" AND filetype="Text" AND author!="John Doe". After giving this scope a friendly name for the client's user interface, and specifying from which sites this scope is available, the scope appears in the drop-down scope list for clients. This scope selection returns only documents with that property value as query results. Scopes defined by an administrator in this manner may also be referred to as authored scopes.

In addition, several default scope selection may be available. A typical client may be presented with an option to search "all content", which simply indicates a non-scoped query. A scope selection for "this site" searches all documents on the current site and its subsites. A scope may also be generated that excludes certain results rather than simply identifying the scope for documents included within a particular subset. For example, a scope definition may correspond to a search for all document types except text (.txt) documents. Another scope definition may correspond to a search for all documents in a network except for those associate with a particular Web Site URL. The number of scope selections, whether default, authored, or otherwise are not limited to those described herein.

In another embodiment, a client is also given the option to enter scope keys directly into a search request. The scope key is given a name for ease of use by the client, typing the name into the search request limits the search by the associated scope.

Figure 2:
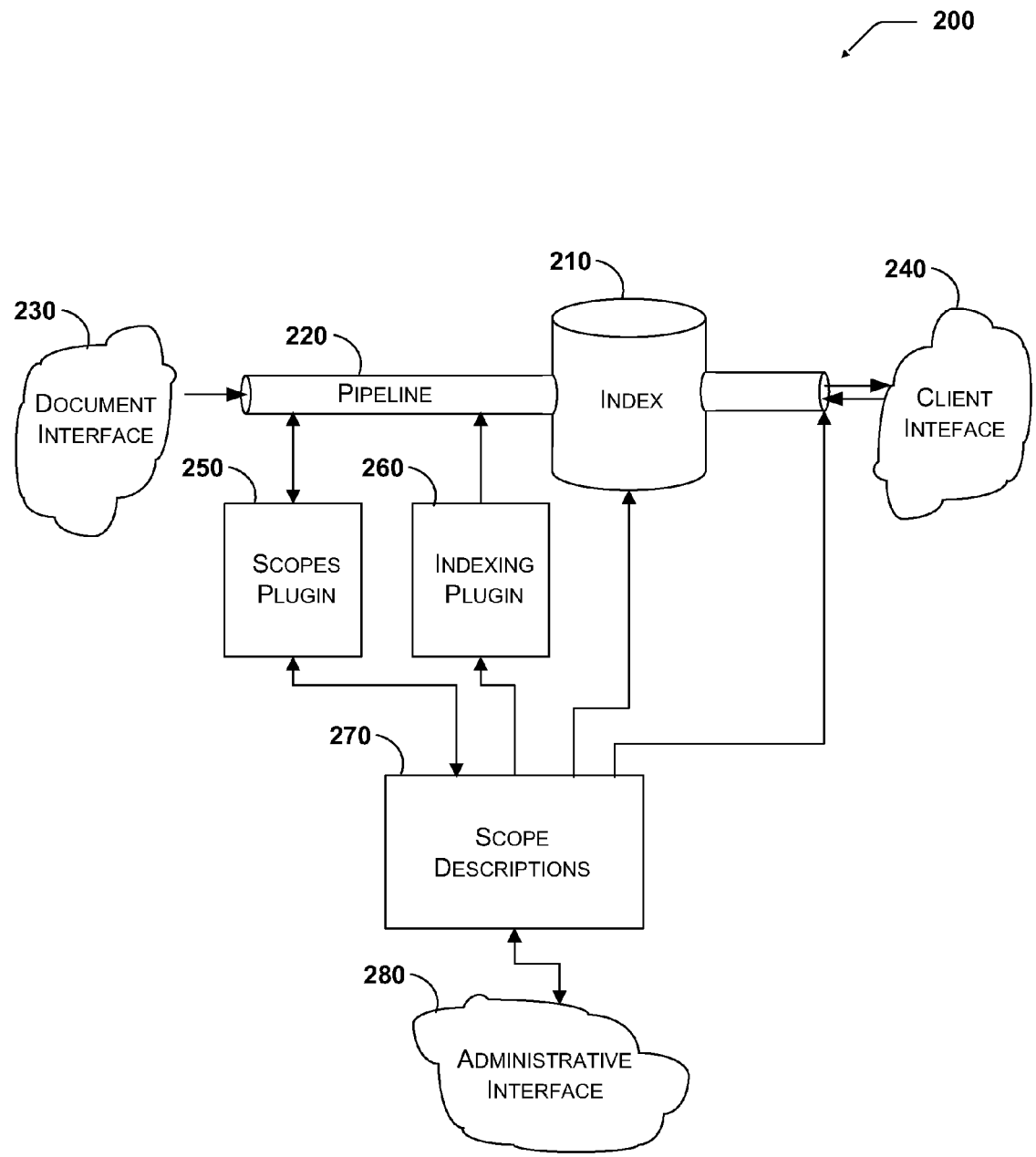
FIG. 2 illustrates a block diagram of an exemplary system for scoping searches using index keys in accordance with the present invention.

FIG. 2 illustrates a functional block diagram of an exemplary system for scoping searches using index keys in accordance with the present invention. System 200 includes index 210, pipeline 220, document interface 230, client interface 240, scopes plugin 250, indexing plugin 260, scope descriptions 270, and administrative interface 280.

Index 210 is structured to include separate indexes for the content keys (i.e., keywords) and for the scope keys. A more detailed description of the structure of index 210 is provided below in the discussion of FIG. 3. The records of these indexes are used in providing results to client queries. In one embodiment, index 210 corresponds to multiple databases that collectively provide the storage for the index records.

Pipeline 220 is an illustrative representation of the gathering mechanism for obtaining the documents or records of the documents for indexing. Pipeline 220 allows for filtering of data by various plugins (e.g., scopes plugin 250) before the records corresponding to the data are entered into index 210.

Document interface 230 provides the protocols, network access points, and database access points for retrieving documents across multiple databases and network locations. For example, document interface 230 may provide access to the Internet while also providing access to a database of a local server and access to a database on the current computing device. Other embodiments may access other document locations using a variety of protocols without departing from the spirit or scope of the invention.

Client Interface 240 provides access by a client to define and initiate a search. The search may be defined according to keywords and/or scope keys. An exemplary method for processing search queries is described in greater detail in the discussion of FIG. 7 below.

Scopes plugin 250 is one of several gatherer pipeline plugins. Scopes plugin 250 identifies property values that are to be reemitted as scope keys (i.e., items to be indexed in the scopes index). Those properties that are identified as interesting properties relative to scope (e.g., file types, URLs, etc.) are gathered by scope plugin 250 as the documents provided through document interface 230 are crawled. These properties are reemitted by scope plugin 250 into pipeline 220 to be included in index 210. These properties are also usable by an administrator or other entity for providing scope selections to a client according to these properties.

Indexing plugin 260 is another plugin connected to pipeline 220. Indexing plugin provides the mechanism for generating, partitioning, and updating index 210. An exemplary method for generating index 210 is described in greater detail in the discussion of FIG. 5 below. An exemplary method for updating index 210 is described in greater detail in the discussion of FIG. 6 below. In one embodiment, indexing plugin 260 provides word lists that temporarily cache the keywords and scope keys generated from crawled documents before flushing these results to index 210. The records of index 210 are populated from the crawl results included in these word lists.

Scope descriptions 270 provides tables that store information about the scopes. For example, scope descriptions 270 may include administrative information and internal information, such as scopes, scope rules, visibility, and other attributes corresponding to the scope related properties and scope selections generated for use in search queries. Scope descriptions 270 receives the properties for generating the scope selections through scope plugin 250. Scope descriptions 270 is also accessed by indexing plugin 260 for generation and organization of the scope index within index 210. Index 210 also accesses scope descriptions 270 for generation and update of the compound scope index (see FIGS. 3 and 4 below). Scope descriptions is also accessed at client interface 240, so that a client may select a scope for inclusion in a search query or select a scope selection to apply to a search.

Administrative interface 280 also access scope descriptions 270 to allow an administrator or other control mechanism (e.g., automated program) to take the properties provided by scopes plugin 250 and create the scope selections for use search queries. Administrative interface 280 may be provided according to any format that allows the creation of the scope selections and manipulation of the scope descriptions, (e.g., via Internet login access).

Despite the illustration in system 200 of one-way and two-way communications between functional blocks, any of these communication types may be changed to another type without departing from the spirit or scope of the invention (e.g., all communications may have an acknowledgment message requiring two-way rather than one-way communication).

Figure 3:
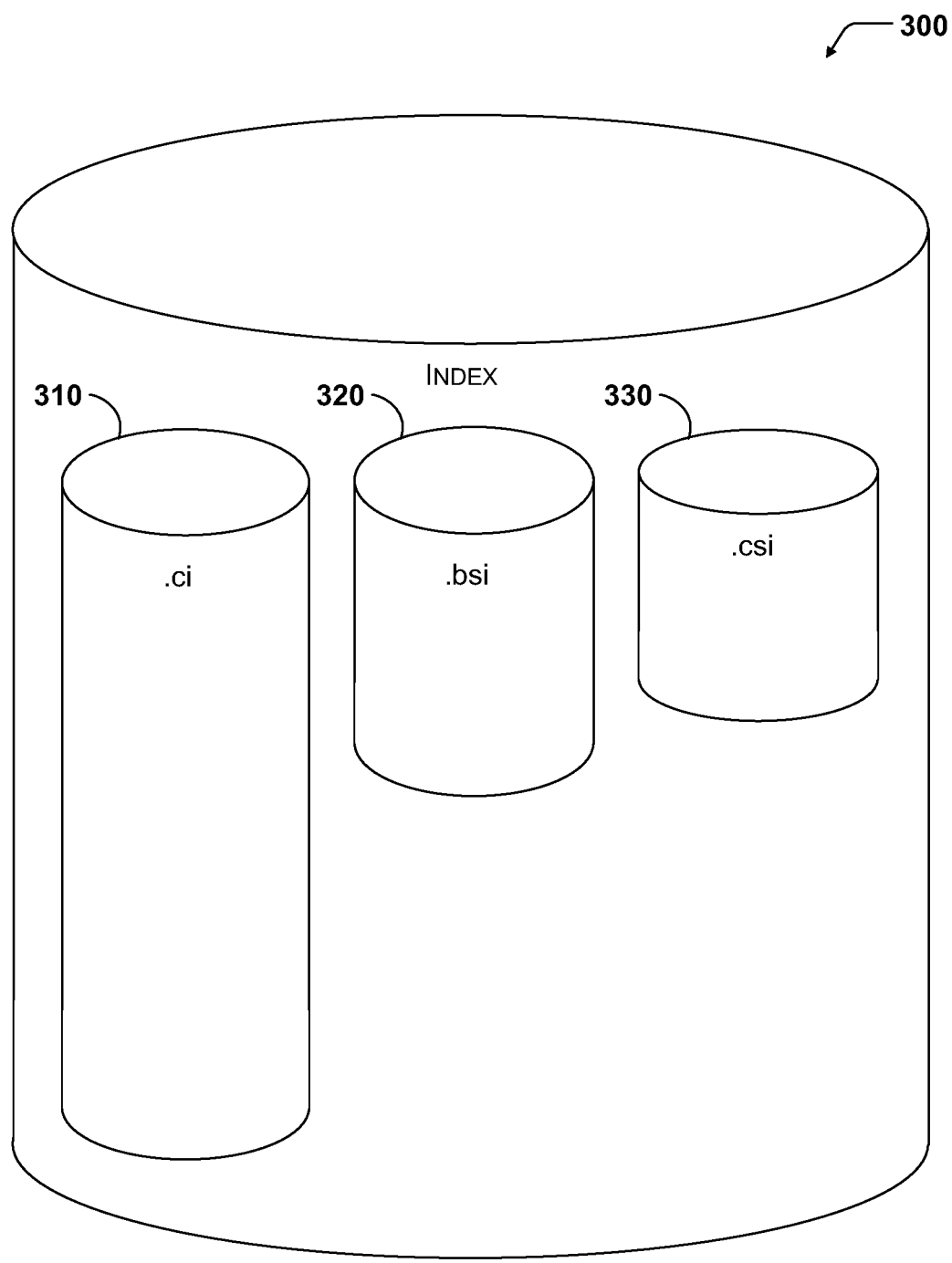
FIG. 3 illustrates a block diagram for an exemplary structure of an index in accordance with the present invention.

FIG. 3 illustrates a functional block diagram for an exemplary structure of an index in accordance with the present invention. Index 300 includes content index (.ci) 310, basic scopes index (.bsi) 320, and compound scopes index (.csi) 330.

Content index 310 includes records organized in an inverted index that lists documents that correspond to the keywords and other index keys used in the search query. The scope keys however, are diverted to basic scopes index 320.

Basic scopes index 320 includes records of documents that correspond to basic scopes. Basic scopes generally refer to scope selections that correspond to a singular scope related property of a document. For example, the numeric ID of a document crawled on site www.example.com would be recorded in the document list for a scope key which was composed by scopes plugin 250 to embody the property (site) and value ("example.com").

Compound scopes index 330 includes scopes that are generated from combinations of the basic scopes in basic scopes index 320. For example, a compound scope may includes records of documents that are a particular file type that are also related to a particular URL.

Figure 4:
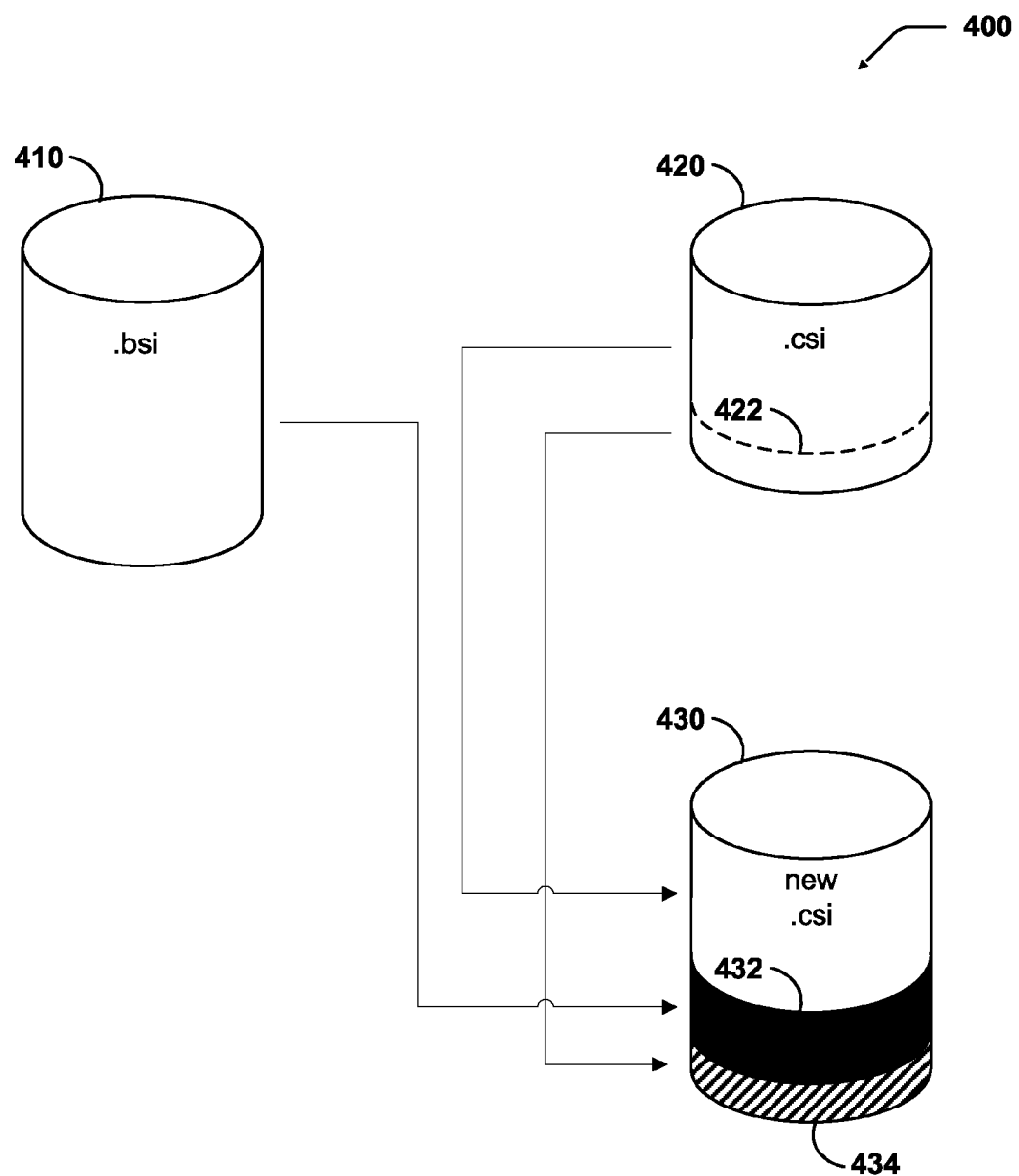
FIG. 4 illustrates an exemplary block diagram for managing compound scopes in accordance with the present invention.

FIG. 4 illustrates an exemplary block diagram for managing compound scopes in accordance with the present invention. Block diagram 400 includes basic scope index 410, original compound scopes index 420, and new compound scopes index 430.

When the basic scopes index is updated with additional basic scopes (see FIG. 6 below), the compound scopes index must also be updated. Position line 422 of original compound scopes index 420 illustrates the position where the new compound scopes should be included. A copy of original compound scopes index 420 is made, producing new compound scopes index 430. The copy of the original compound scopes index 420 is made until the position where the new compound scopes should be included is reached. New compound scopes 432 are then written into new compound scopes index 430. After new compound scopes 432 are included, copying of original compound scopes index 420 continues. The compound scopes 434 that follow new compound scopes 432 are copied from original compound scopes index 420 with an offset that compensates for the inclusion of new compound scopes 432.

Figure 5:
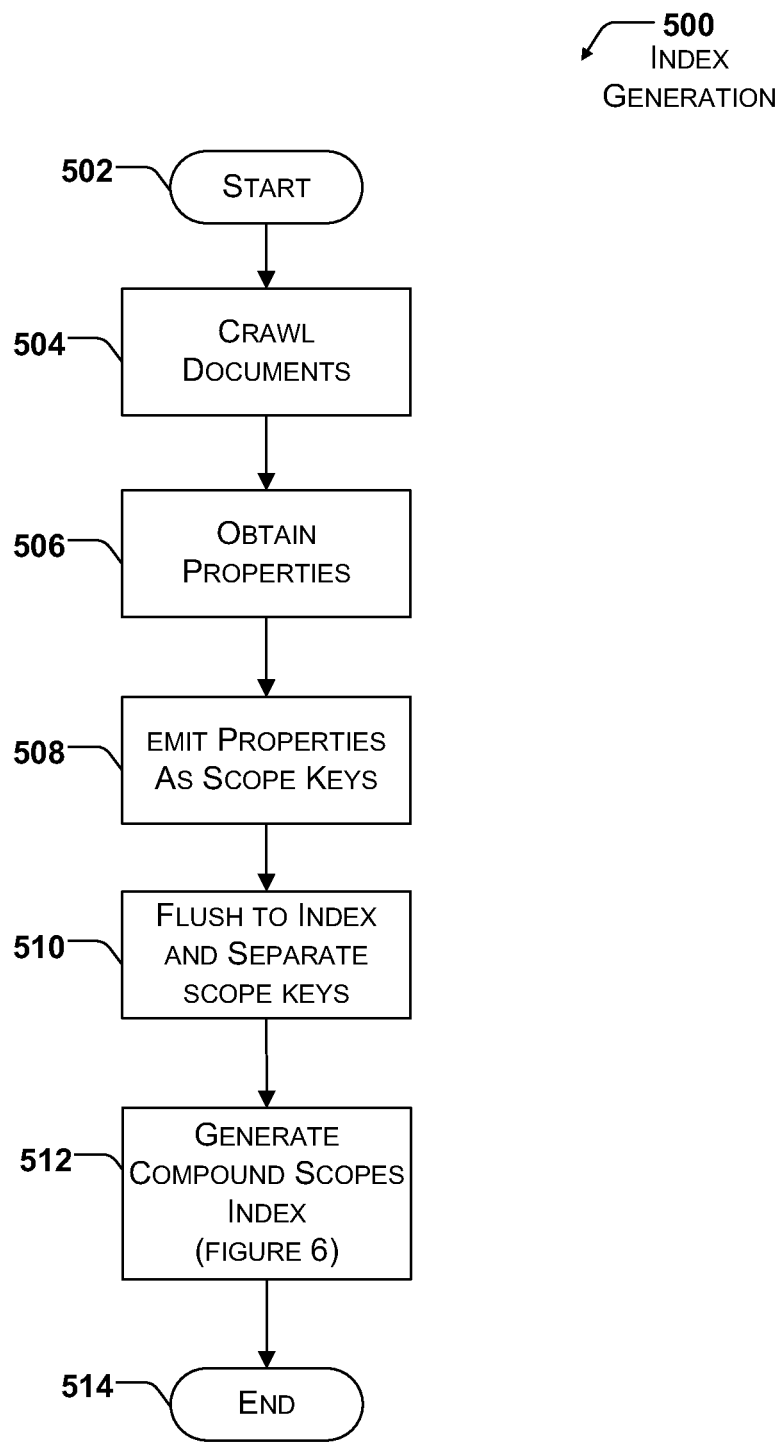
FIG. 5 illustrates a logical flow diagram of an exemplary process for generating an index in accordance with the present invention.

FIG. 5 illustrates a logical flow diagram of an exemplary process for generating an index in accordance with the present invention. Process 500 starts at block 502 where access is provided to a corpus of documents. Processing continues at block 504.

At block 504, the corpus of documents are crawled to determine the documents that exist as well as properties (e.g., file type) that are associated with those documents. An identifier or ID for each of the documents and their associated property are then forwarded as results of the crawl. Processing continues at block 506.

At block 506, the properties associated with the documents that relate to scope are obtained by a scopes plugin. The scopes plugin creates scope definitions from the properties. The scope definitions are usable by an administrator to create scope selections that allow a client to limit a search according to its scope. Processing moves to block 508.

At block 508, the scope definitions created from the obtained properties are emitted as scope keys amongst the results of the crawl. These scope keys operate similarly to the keywords and other index keys generated from the crawl, while being directed to the scope of the search rather than content of the documents. Some of the properties that are obtained for generating the scope keys include the document type, the URL of the document, the document's author, and other properties. The scope key is generated to include an identifier (ID) of the type of scope key and a text string that identifies the particular scope key. For example, if the ID for scope keys related URL is 237, then a scope key corresponding to the document in www.example.com would be "[237] www.example.com". This scope key is emitted into the pipeline and is subsequently associated with the document in the index. Once the scope keys are emitted, processing continues at block 510.

At block 510, the scope keys, keywords, and other accumulated properties found in all the documents are flushed to the index. The flush writes the keys and properties to disk. During the flush, the scope keys are separated and sent to the basic scopes index, while the remaining data is sent to the content index. Processing continues at block 512.

At block 512, the compound scopes index is generated within the index. In one embodiment, the compound scopes index is generated in response to a compilation process that is commenced for the index. One exemplary process used for generating the compound scopes index is described in the discussion of FIG. 6 below. In one embodiment, compound scopes are defined by queries from clients. In another embodiment, a list of compound scopes is generated by an administrator before the index was instantiated. Once the compound scopes index is generated, processing continues to block 514, where process 500 ends.

In one embodiment, the basic scopes index is populated as the crawl is commenced, but the compound scopes index is not populated until the crawl is complete and the basic scopes index is fully built. Waiting to build the compound scopes index reduces overhead by reducing the queries to the basic scopes index.

Figure 6:
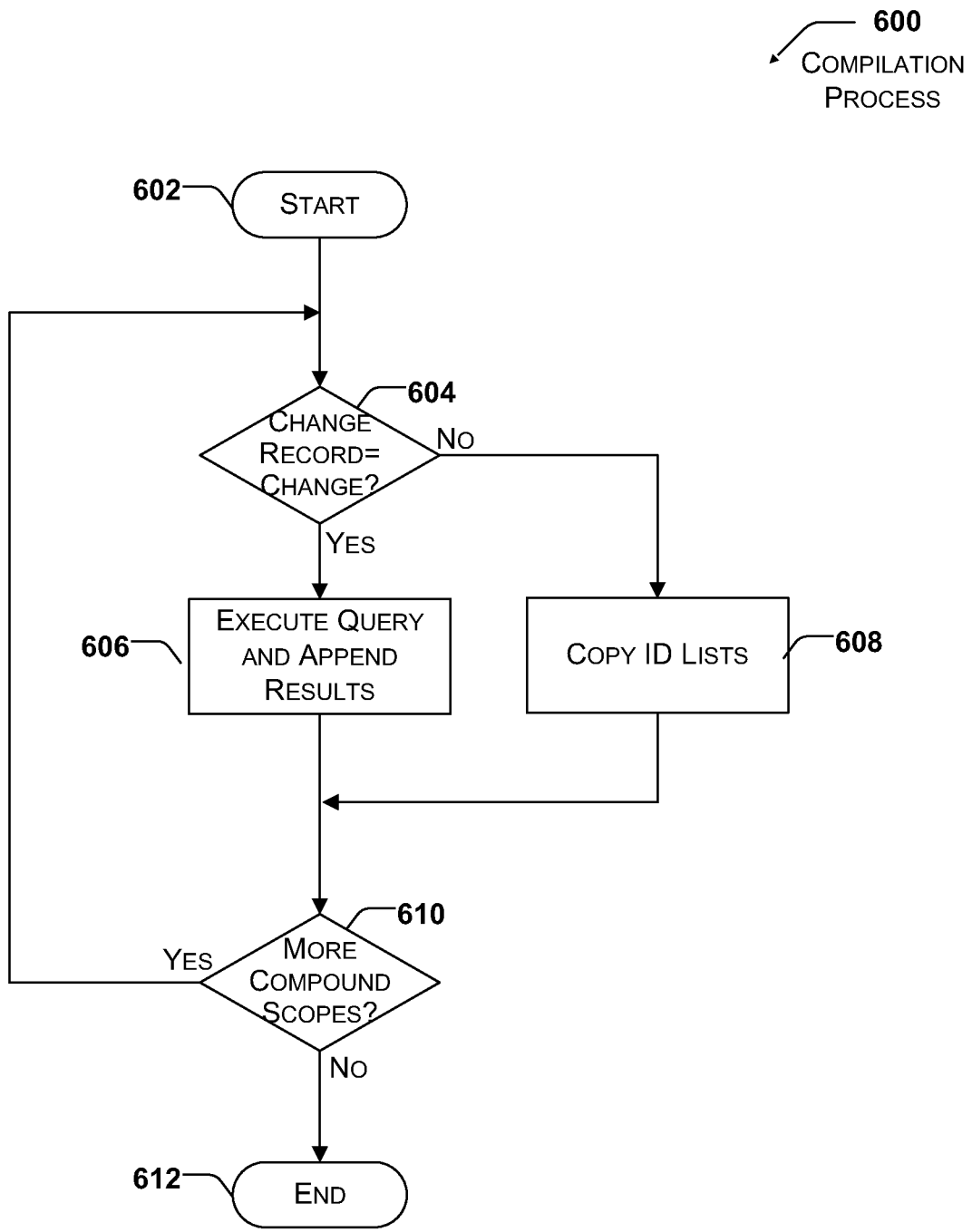
FIG. 6 illustrates a logical flow diagram of an exemplary process for compiling an index in accordance with the present invention.

FIG. 6 illustrates a logical flow diagram of an exemplary process for compiling an index in accordance with the present invention. Process 600 starts at block 602 where the compilation process is commenced. In one embodiment, process 600 is started asynchronously at a certain time interval (e.g., every 15 minutes) to update any existing compound scopes. In another embodiment, process 600 is started when process 500 of FIG. 5 enters block 512 to generate the compound scopes index from the newly generated basic scopes index. In still another embodiment, process 600 is commenced in response to other flushes to the index. Once process 600 is commenced, processing continues at decision block 604.

At decision block 604 a determination is made whether a change record corresponding to each scope within the compound scopes index indicates that the current compound scope has changed. In one embodiment, a similar process is used for generating the compound scopes index for the first time with a default setting that assumes all scopes have changed. Accordingly, generating a new compound scopes index and updating a compound scopes index are handled by the same compilation process. If the compound scope has changed, processing moves to block 606.

At block 606, a compilation process executes a query that is similar to a user query and allows the query process to update the list of documents corresponding to the scope in the compound scopes index. The list of documents is then appended to into compound scopes index as the compound scopes index is copied from its previous version (when a previous version exists). Processing continues at decision block 610.

Alternatively, if the change record indicates that the particular scope has not changed, processing moves to block 608. At block 608, the list of document IDs corresponding to the scope in the previous version of the compound scopes index is copied verbatim since the scope has not changed. Processing continues at decision block 610.

At decision block 610, a determination is made whether more compound scopes need to be copied to the new compound scopes index during the compilation process. If more compound scopes are to be copied, processing returns to decision block 610 to determine if the compounds scopes have changed. However, if no more compound scopes need to be transferred to the new compound scopes index, processing moves to block 612, where process 600 ends.

Updates to the corpus of documents may occur at any time. The document IDs for the corpus of documents are continually updated in an in-memory word list or multiple word lists. The population of the word list results from either initiated searches by clients, refresh actions that cause the corpus to be recrawled, or other various operations that lead to discovery of the change among the corpus of documents. When a document is changed (e.g., add, delete, modify), the document ID for the changed document is then forwarded to the in-memory word list along with the type of change. The word lists with the updated document IDs are then flushed to the index. The change to the document results in an update to the content index while the basic scopes index is also updated. Once the incremental crawl that discovered the change is complete, and the basic scopes index is updated, the compound scopes index is also updated to reflect the change to the documents on the network. Process 600 is used to reflect the updates in the compound scopes index independent of whether the update is a new document amongst the corpus of documents that are searched, a removal of a document from the corpus, or a modification to a document that effects the document's scope. By running the complication process asynchronously, every so often the compound scopes index is updated to reflect the changes to the documents on the network.

Figure 7:
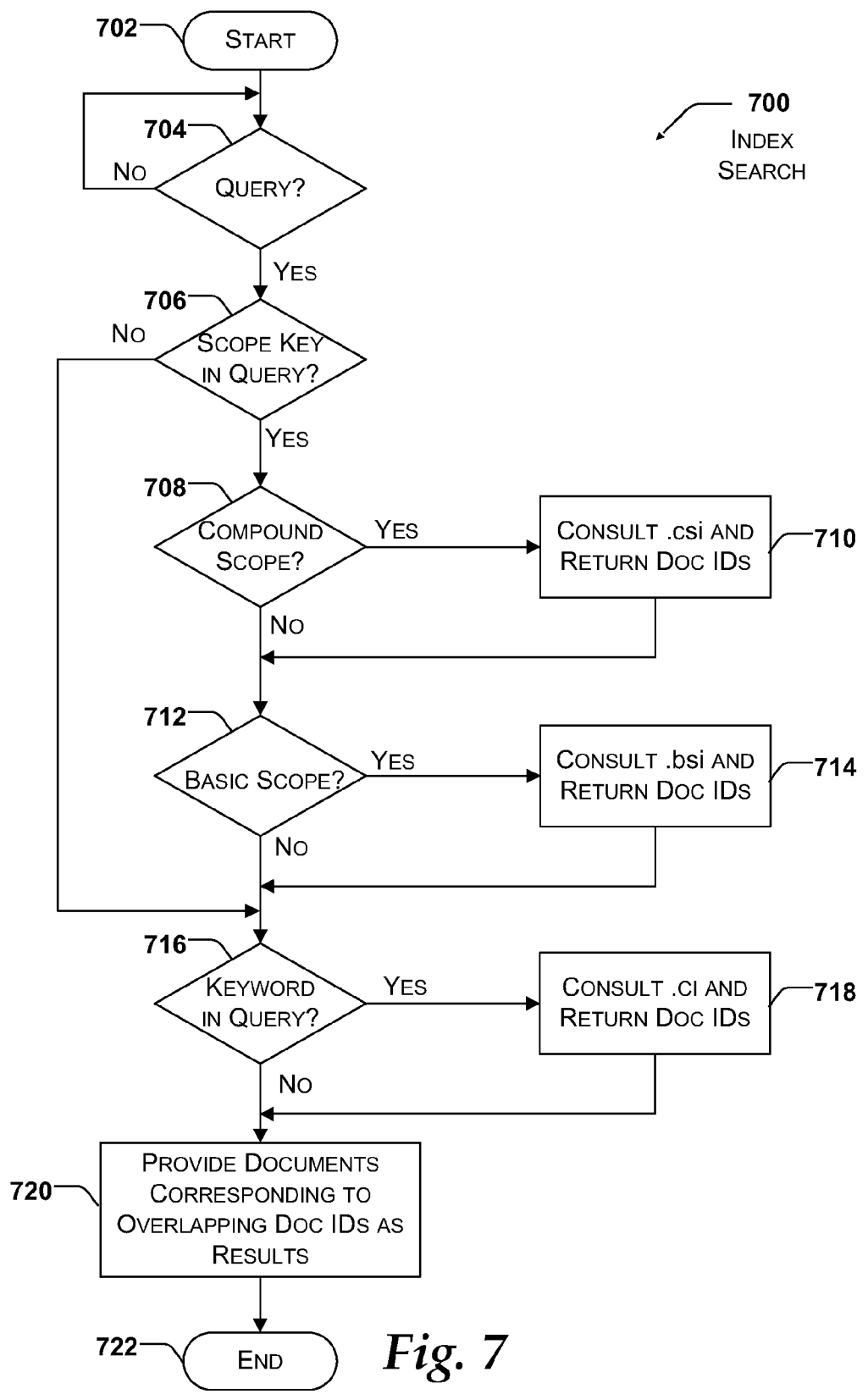
FIG. 7 illustrates a logical flow diagram of an exemplary process for handling a query in accordance with the present invention.

FIG. 7 illustrates a logical flow diagram of an exemplary process for handling a query in accordance with the present invention. Process 700 starts at block 702 where the index is instantiated and ready to accept a query from a client. Processing continues at decision block 704.

At decision block 704, a determination is made whether a search query has been initiated by a client. The client may correspond to a user that initiates a query or a program that is requesting the search. If a search has not been initiated, processing loops back onto block 704 while waiting for a search query to be initiated. However, once a search query is commenced, processing continues at decision block 706.

At decision block 706, a determination is made whether a scope key has been used in the search request. If there is no scope key present, processing advances to block 716. However, if a scope key is present in the search request, processing continues at decision block 708.

At decision block 708, a determination is made whether the instance of the scope key is as a portion of a compound scope. If the scope key is not used as part of a compound scope, processing advances to decision block 712. However, if the scope key is part of a compound scope, processing moves to block 710.

At block 710, the compound scopes index (.csi) is consulted for the documents identified by their document IDs as corresponding the compound scope included in the search query. The document IDs corresponding to these documents are then returned to be added to the search results pending the finalization of the search. Processing continues at decision block 712.

At decision block 712, a determination is made whether the instance of the scope key is as a portion of a compound scope. If the scope key does not correspond to a basic scope, processing advances to block 716. However, if the scope key does correspond to a basic scope, processing moves to block 714.

At block 714, the basic scopes index (.bsi) is consulted for the documents identified by their document IDs as corresponding the scope key included in the search query. The document IDs corresponding to these documents are then returned to be added to the search results pending the finalization of the search. Processing continues at decision block 716.

At decision block 716, a determination is made whether a keyword or other index key related to the content of documents is included in the search request. If a keyword is not included in the search request, processing advances to decision block 720. However if a keyword is included in the search request, processing moves to block 718.

At block 708, the content index (.ci) is consulted for the documents identified by their document IDs as corresponding the keyword included in the search query. In one embodiment, as the content index is search for the keyword, the search is limited to the scope previously defined according to the basic scopes index and/or the compound scopes index.

The document IDs corresponding to these documents are then returned to be added to the search results pending the finalization of the search. Processing continues at decision block 710.

At block 720, the collection of document IDs for documents that overlapped in the different index partitions are returned as the query results. For example, the document ID may be correspond to a scope of the basic scopes index and also include a particular keyword. If the search request was limited by this particular scope and included the keyword, then the document ID would overlap between the index partitions. These overlapping IDs represent the results of the search. A pointer to each document included in the results can then be provided to the client in response to the search request. Typically, it is much faster to determine overlapping documents among indexes instead of consulting document properties to verify if the document is with an particular scope. Where document properties are generally located at random within a database, the index is clustered on a disk according to the keys (scope keys or keywords). The present invention therefore greatly increases the speed and ease by which a scope can be applied to a search query. Once the results are provided, processing moves to block 722, where process 700 ends.

In one embodiment, the process steps provided in operational blocks 708-718 are not sequential. Instead the basic scopes index or the compound scopes index or the content index are consulted based on the regular keys and scope keys of the query and the order they are consulted in depends on the sort order of the document IDs that correspond to the keys. In addition, the process steps provided in operational blocks 708-718 may need to be repeated multiple times as there may be multiple scopes, both compound scopes and basic scopes, included in a search query.

In another embodiment, the compound scopes index is updated with a new compound scope after each search request if a new compound scope is created by the request. The compound scopes index is updated according the method provided in the discussion of FIG. 4 above.

In still another embodiment, the scoped portion of a search request is a search selection made by the client. The search selection corresponds to a pre-selected scope of the results according to a list of scopes provided. This list of scopes may be generated by an administrator according to the scope definitions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for establishing a search scope for a query of documents, comprising:
   identifying properties related to the documents;
   generating scope-related index keys according to the identified properties;
   generating content-related index keys according to content of the documents, wherein the content-related index keys identify keywords in the documents;
   generating an index with a computing device, the index including:
      a first sub-index storing data associating the content-related index keys with subsets of the documents that contain the content identified by the respective content-related index keys;
      a second sub-index storing scope-related index keys, each scope-related index key being associated with a subset of the documents that have a property identified by the scope-related index key; and
      a third sub-index storing compound scope-related index keys, each compound scope-related index key being generated from two or more of the scope-related index keys in the second sub-index, each compound scope-related index key being associated with a subset of the documents that have two or more properties identified by the two or more scope-related index keys; and
   providing results to a search query containing a keyword and a scope limitation by:
      determining whether the scope limitation is a basic scope limitation or a compound scope limitation and using the respective second sub-index or the third sub-index to identify the subset of the documents that match the scope limitation;
      using the first sub-index to identify the documents within the subset of the documents that contain the keyword; and
      comparing the subset of the documents that contain the keyword with the subset of the documents that match the scope limitation to determine a common set of documents, and to identify the set of documents that satisfy the search query.

2. The method of claim 1, wherein the documents are in a network.

3. The method of claim 1, wherein the third sub-index includes additional properties organized according to combinations of the scope-related index keys such that another search scope is defined by the combination.

4. The method of claim 3, wherein the combination of the scope-related index keys corresponds to a Boolean combination.

5. The method of claim 1, wherein a change amongst the documents that are queried causes an update to the index such that an additional property is associated with the scope-related index key in the second sub-index and third sub-index when the additional document is associated with the property, wherein the change corresponds to at least one of new document inserted amongst the documents, a document amongst the documents being removed, and a modification to a document amongst the documents.

6. The method of claim 1, wherein the property includes a document identifier that identifies the document for the query.

7. The method of claim 1, further comprising generating a scope selection according to the scope-related index key such that the scope selection is selectable by a client for providing a scope to a client generated query.

8. The method of claim 1, further comprising providing an interface for manually generating and manipulating additional scope-related index keys from additional properties associated with additional search scopes of the documents.

9. A computer-readable storage device that includes computer-executable instructions for establishing a search scope for a query of documents, the instructions comprising:
   identifying properties related to the documents, the documents being identified during a crawl;
   generating scope-related index keys according to the identified properties;
   generating an index with a computing device, the index including:
      a content sub-index storing data associating the content-related index keys with subsets of the documents that contain the content identified by the respective content-related index keys;

a basic scopes sub-index storing data associating the scope-related index keys with subsets of the documents that have properties identified by the respective scope-related index keys; and a compound scopes sub-index storing compound scope-related index keys, each compound scope-related index key being generated from two or more of the scope-related index keys in the basic scopes sub-index, each compound scope-related index key being associated with a subset of the documents that have two or more properties identified by the two or more scope-related index keys;

providing results to a search query containing a keyword and one or more of a basic scope limitation by:

determining whether the scope limitation is a compound scope limitation or a basic scope limitation and using the respective compound scopes sub-index or the basic scopes sub-index to identify the subset of the documents that match the scope limitation;

using the content sub-index to identify the documents within the subset of the documents that contain the keyword; and comparing the subset of documents that contain the keyword with the subset of the documents that match the scope limitation to determine a common set of documents, and to identify the set of documents that satisfy the search query.

10. The computer-readable storage device of claim 9, wherein arranging the compound scopes sub-index includes additional properties organized according to combinations of the scope-related index keys such that another search scope is defined by the combination.

11. The computer-readable storage device of claim 10, wherein the compound scopes sub-index is updated asynchronously to an update of the content sub-index and the basic scopes sub-index.

12. The computer-readable storage device of claim 9, wherein arranging the index further comprises updating the index when an additional document inserted amongst the documents that are queried, such that an additional property is associated with the scope-related index key when the additional document is associated with the identified property.

13. The computer-readable storage device of claim 9, wherein each of the property includes a document identifier that identifies the document for the query.

14. A system for establishing a search scope for a query of documents, comprising:

a processor; and memory storing computer-executable instructions, which when executed by the processor, cause the processor to:

identify properties related to the documents;

generate scope-related index keys according to the identified properties;

generate content-related index keys according to content of the documents, wherein the content-related index keys identify keywords in the documents;

generate an index with a computing device, the index including:

a content sub-index storing data associating the content-related index keys with subsets of the documents that contain the content identified by the respective content-related index keys;

a basic scopes sub-index storing data associating the scope-related index keys with subsets of the documents that have properties identified by the respective scope-related index keys; and a compound scopes sub-index storing compound scope-related index keys, each compound scope-related index key being generated from two or more of the scope-related index keys in the basic scopes sub-index, each compound scope-related index key being associated with a subset of the documents that have two or more properties identified by the two or more scope-related index keys; and providing results to a search query containing a keyword and a scope limitation by:

determining whether the scope limitation is a basic scope limitation or a compound scope limitation and using the basic scopes sub-index or the compound scopes sub-index to identify the subset of the documents that match the scope limitation;

using the content sub-index to identify the documents within the subset of the documents that contain the keyword; and comparing the subset of the documents that contain the keyword with the subset of the documents that match the scope limitation to determine a common set of documents, and to identify a set of the documents that satisfy the search query.

15. The system of claim 14, wherein the compound scopes index includes additional properties organized according to combinations of the scope-related index keys such that another search scope is defined by the combination.

16. The system of claim 15, wherein the combination of the scope-related index keys corresponds to a Boolean combination.

17. The system of claim 14, wherein a change amongst the documents that are queried causes an update to the index such that an additional property is associated with the scope-related index key in the basic scopes index and compound scopes index when the additional document is associated with the property, wherein the change corresponds to at least one of new document inserted amongst the documents, a document amongst the documents being removed, and a modification to a document amongst the documents.

18. The system of claim 14, wherein the property includes a document identifier that identifies the document for the query.

19. The system of claim 14, further comprising generating a scope selection according to the scope-related index key such that the scope selection is selectable by a client for providing a scope to a client generated query.

20. The system of claim 14, further comprising providing an interface for manually generating and manipulating additional scope-related index keys from additional properties associated with additional search scopes of the documents.

* * * * *